US012176173B1

(12) United States Patent
Fairchild et al.

(10) Patent No.: US 12,176,173 B1
(45) Date of Patent: Dec. 24, 2024

(54) CATHODES HAVING CARBON NANOTUBE (CNT) FIBERS WOUND ONTO METALLIC SUBSTRATES

(71) Applicant: The Government of the United States, as represented by the Secretary of the Air Force, Wright-Patterson AFB, OH (US)

(72) Inventors: Steven Fairchild, Beavercreek, OH (US); Dmitri Tsentalovich, Austin, TX (US); Nathaniel Lockwood, Alexandria, VA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 17 days.

(21) Appl. No.: 18/436,353

(22) Filed: Feb. 8, 2024

(51) Int. Cl.
*H01J 1/304* (2006.01)

(52) U.S. Cl.
CPC .................................. *H01J 1/304* (2013.01)

(58) Field of Classification Search
CPC ...................................................... H01J 1/304
USPC ..................................................... 313/346 R
See application file for complete search history.

(56) References Cited

U.S. PATENT DOCUMENTS

| | | | |
|---|---|---|---|
| 6,875,462 | B2 | 4/2005 | Shiffler, Jr. |
| 8,262,835 | B2 | 9/2012 | Fisher et al. |
| 8,419,885 | B2 | 4/2013 | Fisher et al. |
| 8,766,522 | B1 | 7/2014 | Fairchild et al. |
| 10,714,293 | B1 | 7/2020 | Fairchild |
| 11,373,833 | B1 | 6/2022 | Hoff et al. |
| 2016/0243636 | A1 | 8/2016 | Longtin et al. |
| 2016/0263708 | A1 | 9/2016 | Fisher et al. |

FOREIGN PATENT DOCUMENTS

| | | | | |
|---|---|---|---|---|
| CN | 1988108 A | * | 6/2007 | ............. H01J 63/02 |
| CN | 102522283 A | * | 6/2012 | |

(Continued)

OTHER PUBLICATIONS

Rémi Longtin, et al., “Active Vacuum Brazing of CNT Films to Metal Substrates for Superior Electron Field Emission Performance”, Sci. Technol. Adv. Mater., Feb. 2015, vol. 16 (No. 1), 015005, 12 pages.

(Continued)

*Primary Examiner* — Christopher M Raabe
(74) *Attorney, Agent, or Firm* — AFMCLO/JAZ; Richard M. Mescher

(57) ABSTRACT

A field emission (FE) cathode for a vacuum electronic device (VED) includes a metallic substrate configured to be connected to one of an electrical power supply and an electrical ground, and at least one continuous carbon nanotube (CNT) fiber in tension around at least a portion of the metallic substrate. The substrate can be a cylinder, hoop, plate, stub etc. The at least one continuous CNT fiber can include a filament, yarn, braided yarn, film, fabric, or combination thereof. The at least one continuous CNT fiber is secured to the electrically conductive substrate by vacuum brazing or any other suitable means. Also, a continuous CNT fabric can be secured in either tension or compression to maintain a uniform height of the continuous CNT fabric.

19 Claims, 27 Drawing Sheets

(56) References Cited

FOREIGN PATENT DOCUMENTS

| | | | | |
|---|---|---|---|---|
| CN | 102543620 A | * | 7/2012 | |
| CN | 105810536 A | * | 7/2016 | H01J 23/04 |

OTHER PUBLICATIONS

Robert Cross et al., "A Metallization and Bonding Approach for High Performance Carbon Nanotube Thermal Interface Materials", Nanotechnology 21 (2010) 445705, 9 pages.
Indranil Lahiri, et al., "Carbon Nanotubes: How Strong Is Their Bond with the Substrate?", ACS Nano, vol. 5 (No. 2), pp. 780-787, 2011, 8 pages.
Dawei Zhang, "Bonding Performances of Epoxy Coatings Reinforced by Carbon Nanotubes (CNTs) on Mild Steel Substrate with Different Surface Roughness", Composites Part A: Applied Science and Manufacturing, vol. 147, Aug. 2021, 106479, 11 pages.
Chaminda P. Nawarathne, "Chemical Bond Formation Between Vertically Aligned Carbon Nanotubes and Metal Substrates at Low Temperatures", Appl. Sci., 2021, vol. 11 (No. 20), 9529, 15 pages.
Don Shiffler, et al.; Review of Cold Cathode Research at the Air Force Research Laboratory; IEEE Transactions on Plasma Science, vol. 36, No. 3, Jun. 2008. 11 pages.
S.B. Fairchild, et al.; Strongly Anisotropic Field Emission From Highly Aligned Carbon Nanotube Films; J. Appl. Phys. 129, 125103 (2021), Mar. 24, 2021. 15 pages.
Brad W. Hoff, et al.; Brazed Carbon Fiber Fabric Field Emission Cathode; Rev. Sci. Instrum. 91, 064702 (2020), Jun. 5, 2020; https://doi.org/10.1063/5.0006371. 7 pages.
S.B. Fairchild, et al.; Morphology Dependent Field Emission of Acid-Spun Carbon Nanotube Fibers; IOP Science Publishing, Nanotechnology 26, 105706, Feb. 19, 2015. 10 pages.

* cited by examiner

FIG. 7A
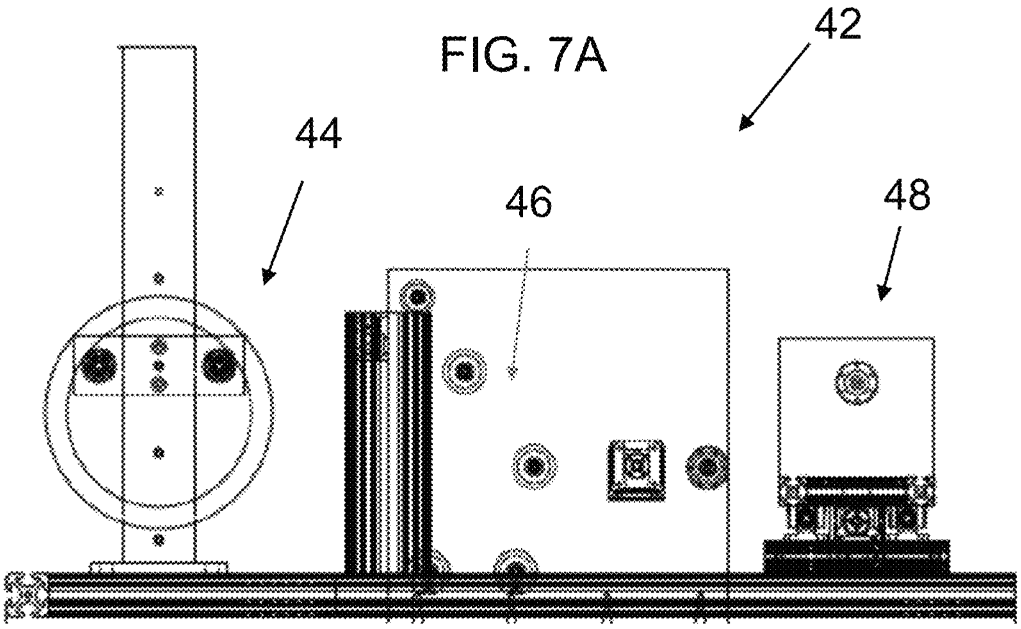
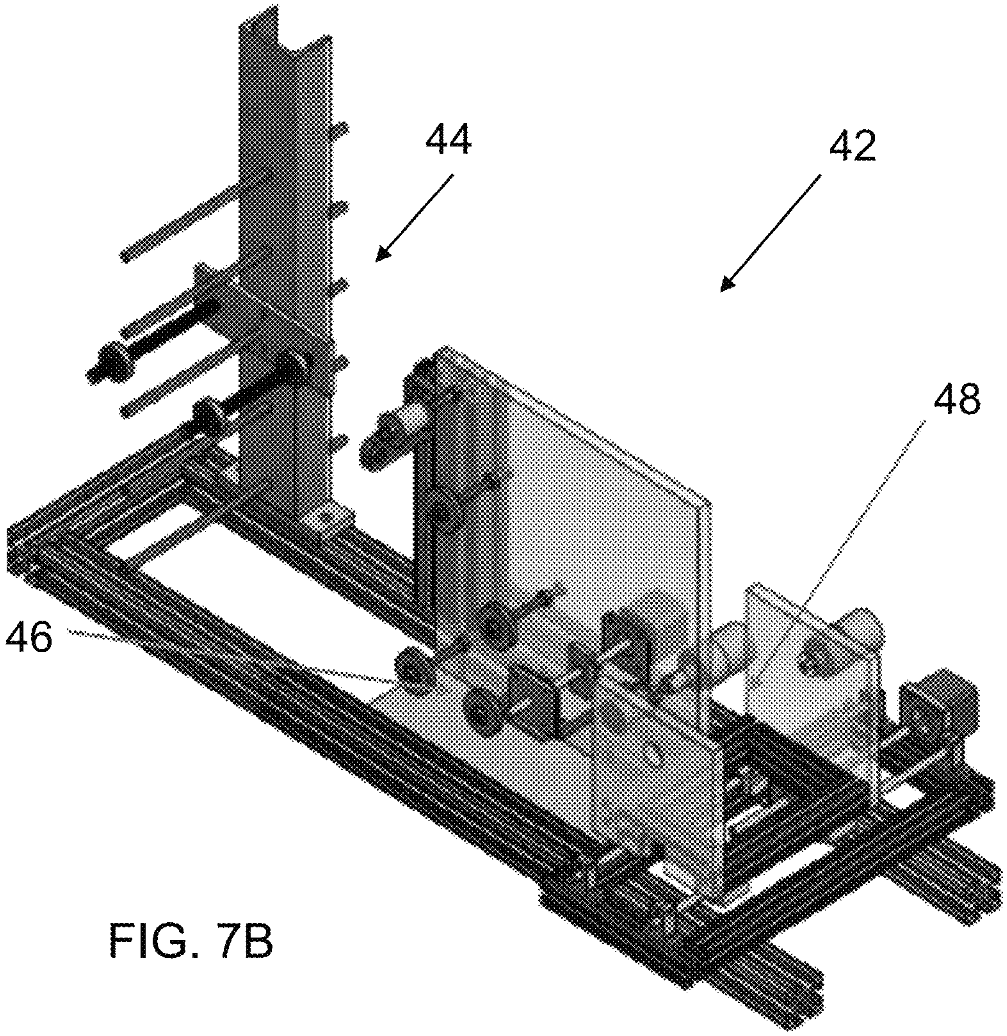
FIG. 7B

CATHODES HAVING CARBON NANOTUBE (CNT) FIBERS WOUND ONTO METALLIC SUBSTRATES

RIGHTS OF THE GOVERNMENT

The invention described herein may be manufactured and used by or for the Government of the United States for all governmental purposes without the payment of any royalty.

FIELD OF THE INVENTION

The present invention relates generally to electrodes and, more specifically, to Field emission cathodes comprising continuous CNT fibers for use in vacuum electronic devices and the like.

BACKGROUND OF THE INVENTION

Field emission (FE) cathodes for vacuum electronic devices (VEDs) are typically made with high aspect ratio wire or fiber-type structures that are mounted on electrically-conductive substrates such as for example, but not limited to, metallic substrates. The fibers are rigid and vertically-aligned so that they point towards an applied electric field. This type of vertical geometry results in a large concentration of electric field lines at free tips of the fibers which lead to field emission of electrons. This process can be accompanied by intense localized heating and plasma formation at the fiber free tips resulting in erosion of the fiber free tips and eventual breakdown and failure of the FE cathode.

The current state of the art material for FE cathodes in VEDs is rigid carbon fiber (FIGS. 1A and 1B). See Shiffler et al., Review of Cold Cathode Research at Air Force Research Laboratory, IEEE *Transactions on Plasma Science*, Vol. 36, No. 3, June 2008, the disclosure of which is expressly incorporated herein in its entirety by reference. These FE cathodes are manufactured using a technique called flocking. Flocking is a process of depositing many small fiber particles (referred to as "flock") onto an electrically-conductive adhesive-coated surface. This process is accomplished with the application of a high-voltage electric field in a flocking machine. The flock is given a negative charge while the substrate is grounded. The flock flies vertically onto the substrate, attaching to a previously-applied electrically-conductive adhesive coating to create a velvet-like surface consisting of vertically-aligned carbon fibers. The diameter of the individual fibers is typically only about a few thousandths of a centimeter, and the length typically ranges from about 0.25 to about 5 mm. Macroscopic carbon nanotube (CNT) fibers may also be vertically mounted onto a horizontal substrate, i.e., the macroscopic CNT fibers are mounted orthogonal to the substrate. These macroscopic CNT fibers have diameters ranging from about 10 to about 100 μm.

When vertically mounted for FE cathodes, the macroscopic CNT fibers must be cut to a specific length either mechanically or with a laser. However, since the macroscopic CNT fibers are not stiff, they lean or droop making it difficult to mount multiple macroscopic CNT fibers that are all vertical and of the same height, which is critical for use as a FE cathode. Additionally, mechanically-cut tips usually introduce rough edges with dangling fibrils (see FIG. 2A). Laser cutting the macroscopic CNT fibers largely reduces tip roughness, however, the tips of the macroscopic CNT fibers are still spread out at their ends, i.e., frayed ends (see FIG. 2B). The tip spread and frayed ends are undesirable because they lead to non-uniform emission, uneven temperature distribution, and hotspots at the tips of the macroscopic CNT fibers.

U.S. patent application Ser. No. 16/933,048 filed on Jul. 20, 2020, and entitled "Carbon Nanotube Yarn Cathode Using Textile Manufacturing Methods", the subject matter of which is expressly incorporated herein in its entirety, discloses using continuous CNT fiber filaments, threads, or yarns, and/or tapes or ribbons that are knitted, woven, sewn, and/or embroidered to form CNT textiles using existing textile manufacturing techniques and equipment. See FIGS. 3A and 3B showing an exemplary CNT textile forming emitter loops on a top surface.

Each continuous CNT fiber of the CNT textiles is composed of multiple CNTs and exhibits higher specific strength, better flexibility, higher electrical conductivity compared to traditional carbon fibers. The current preparation methods of continuous CNT fibers include, but are not limited to, wet spinning, array spinning, and floating catalyst chemical vapor deposition (FCCVD). FIGS. 4A to 4D show spools of exemplary continuous CNT fiber filaments, continuous CNT fiber threads or yarns (a plurality of continuous fiber filaments secured together), continuous CNT fiber braided yarns (a plurality of continuous fiber filaments, threads, and/or yarns braided together), and continuous CNT fiber ribbons or tapes. Such continuous CNT fibers are available from Dexmat, Inc. of Houston, Texas.

To manufacture a FE cathode using the CNT textile, the CNT textile is mounted onto a conductive substrate using traditional techniques. While these CNT textiles can be very effective when properly manufactured and mounted to the conductive substrate, it can be very difficult to obtain and maintain a uniform CNT textile height.

Accordingly, there is a continuing need for FE electrodes with improved performance which are able to withstand the rigors of use in VEDs and the like and can be easily and repeatably manufactured.

SUMMARY OF THE INVENTION

The present invention overcomes the foregoing problems and other shortcomings, drawbacks, and challenges of electrodes for VEDs. While the invention will be described in connection with certain embodiments, it will be understood that the invention is not limited to these embodiments. To the contrary, this invention includes all alternatives, modifications, and equivalents as may be included within the spirit and scope of the present invention.

According to one disclosed embodiment of the present invention, an electrode for a vacuum electronic device (VED) comprises an electrically-conductive substrate, and at least one continuous carbon nanotube (CNT) fiber in tension and/or compression around at least a portion of the electrically-conductive substrate and secured to the electrically-conductive substrate by a conductive bond.

According to another disclosed embodiment of the present invention, an electrode for a VED comprises an electrically-conductive metallic substrate, and a carbon nanotube (CNT) fabric comprising at least one continuous CNT fiber over at least a portion of the electrically-conductive substrate and secured by a conductive bond to the electrically-conductive metallic substrate. The CNT fabric is secured in tension and/or compression.

According to yet another disclosed embodiment of the present invention, A field emissive cathode for a VED comprises an electrically-conductive metallic substrate, and at least one continuous carbon nanotube (CNT) fiber in tension and/or compression around at least a portion of the electrically-conductive substrate. The at least one continuous CNT fiber is secured to the electrically-conductive metallic substrate by a conductive bond. The electrically-conductive substrate is one of a cylinder, a hoop, a circular plate, and a rectangular plate. The continuous CNT fiber is one of a continuous CNT fiber filament, a CNT fiber yarn, a continuous CNT fiber braided yarn, a continuous CNT film, and a continuous CNT fabric. The conductive bond between the continuous CNT fiber and the electrically-conductive substrate comprises one or more of a carbon-based epoxy, a silver epoxy, a CNT-containing adhesive, a nanocarbon-containing adhesive, electroplating bond, or vacuum brazing material.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 7A is a right-side elevational view of a fiber winding machine for winding the continuous CNT fiber of FIGS. 4A to 4D onto the electrically-conductive substrate of FIG. 6A under a desired uniform tension to form the FE cathode of FIGS. 6B to 6E.

FIG. 7B is a perspective view of the fiber winding machine of FIG. 7A.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1A:
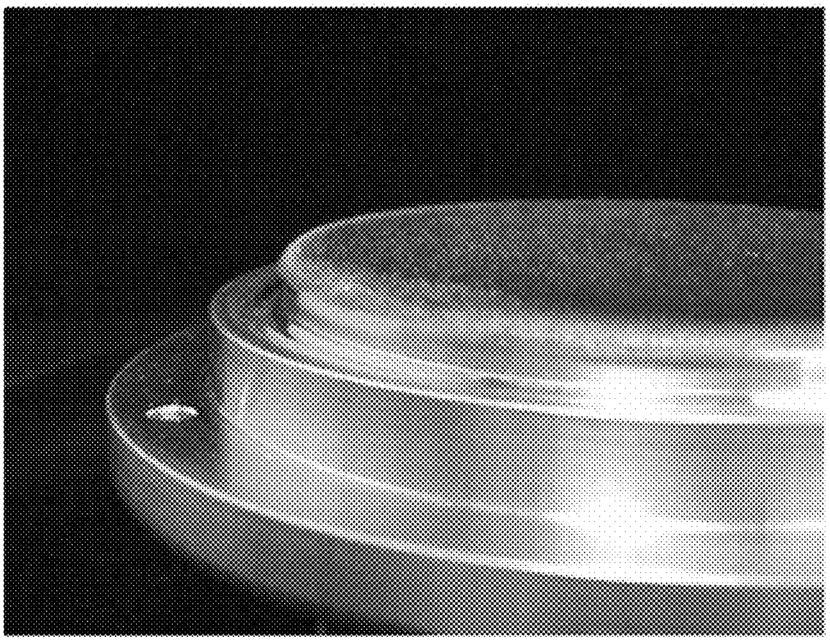
FIG. 1A PRIOR ART
FIG. 1A a fragmented perspective view of a prior art field emission (FE) cathode having flocked carbon fiber thereon.
Figure 1B:
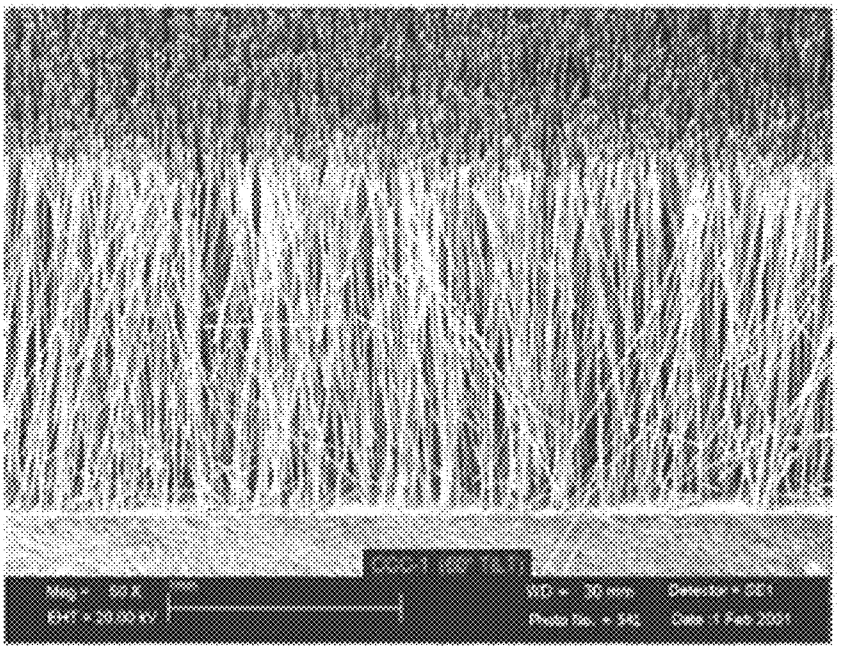
FIG. 1B PRIOR ART
FIG. 1B is an enlarged portion of the prior art FE cathode of FIG. 1A showing the flocked carbon fiber.
Figure 2A:
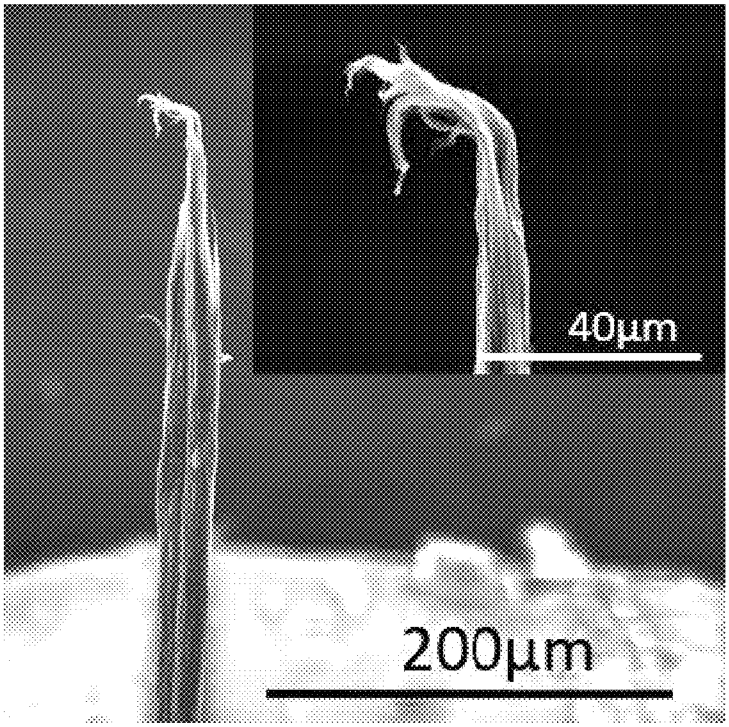
FIG. 2A PRIOR ART
FIG. 2A is a fragmented perspective view of a magnified mechanically-cut free tip of a prior art carbon nanotube fiber.
Figure 2B:
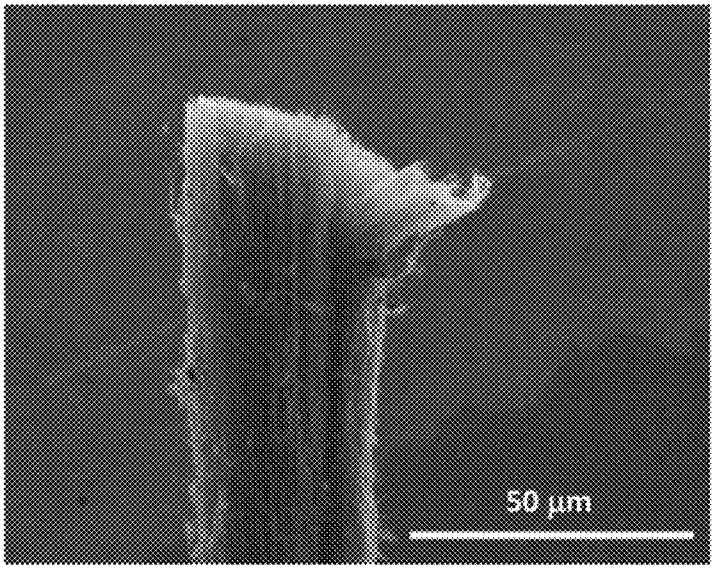
FIG. 2B PRIOR ART
FIG. 2B is a fragmented perspective view of a magnified laser-cut free tip of a prior art carbon nanotube fiber.
Figure 3A:
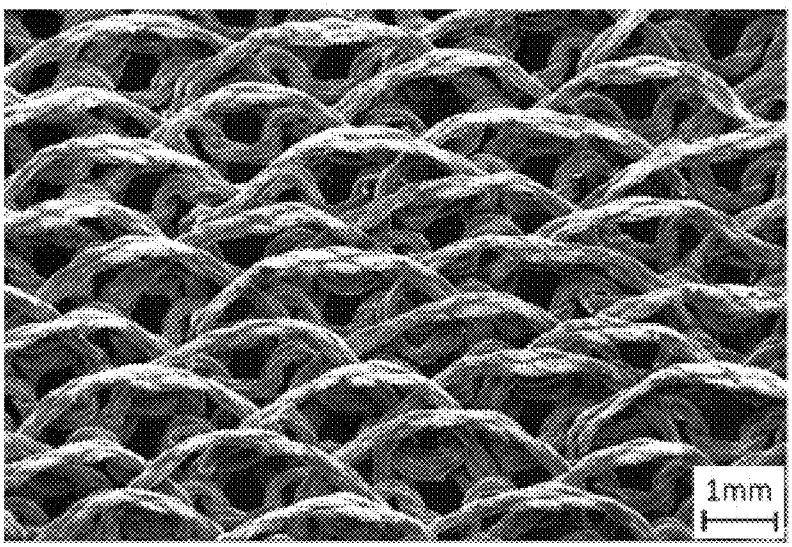
FIG. 3A PRIOR ART
FIG. 3A is a perspective view of a top surface of a carbon nanotube (CNT) textile forming emitter loops.
Figure 3B:
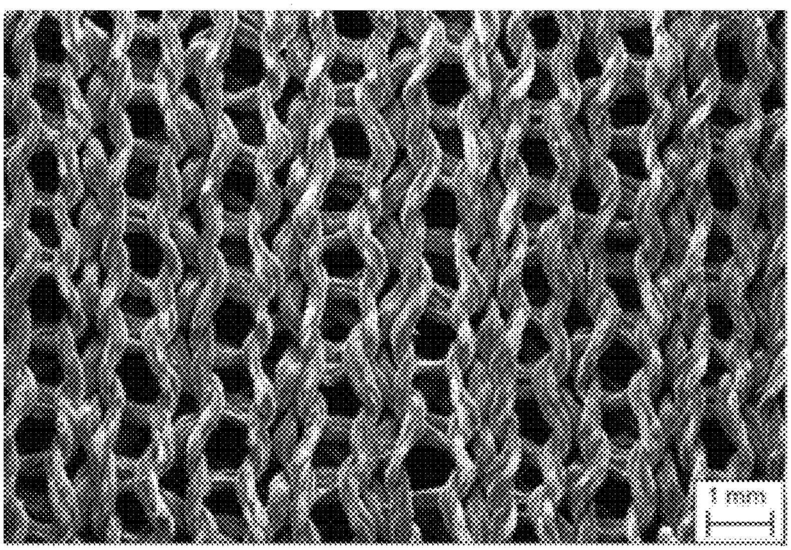
FIG. 3B PRIOR ART
FIG. 3B is a perspective view of a relatively flat bottom surface of the CNT textile of FIG. 3A.
Figure 4A:
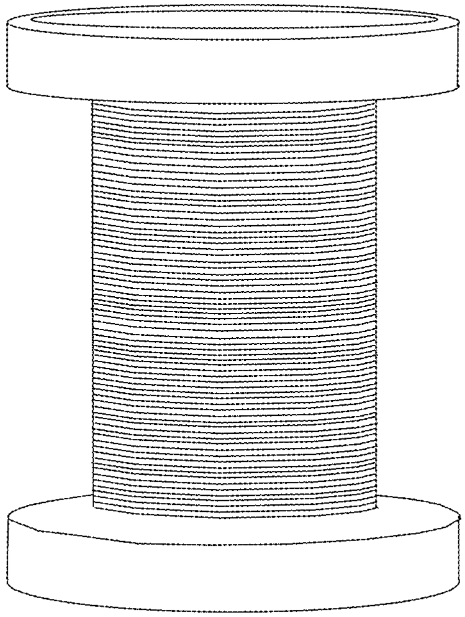
FIG. 4A is a perspective view of a spool of continuous CNT fiber filament.
Figure 4B:
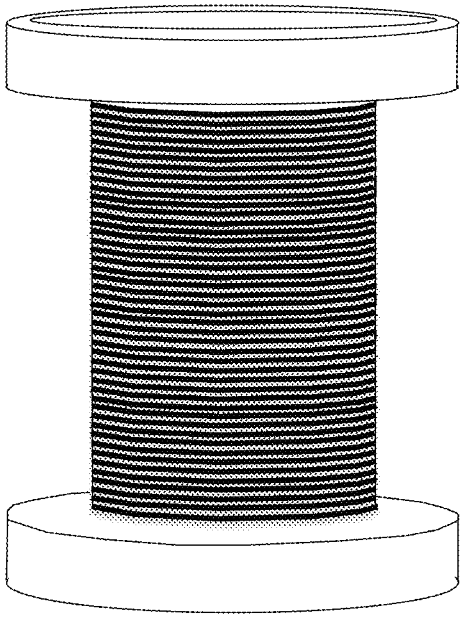
FIG. 4B is a perspective view of a spool of continuous CNT fiber thread or yarn (a plurality of continuous fiber filaments secured/twisted together).
Figure 4C:
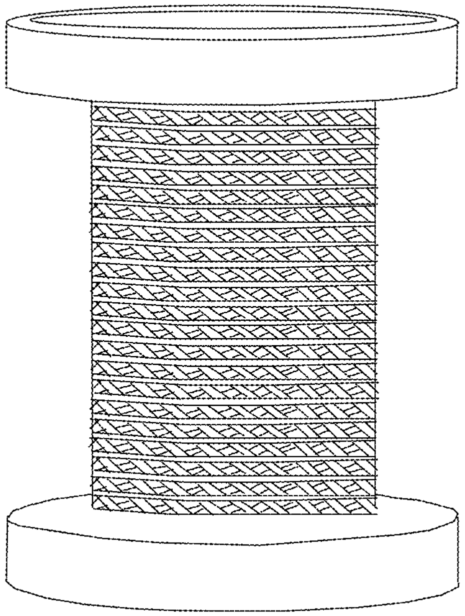
FIG. 4C is a perspective view of a spool of continuous CNT fiber braided yarn (a plurality of continuous fiber filaments and/or yarns braided together).
Figure 4D:
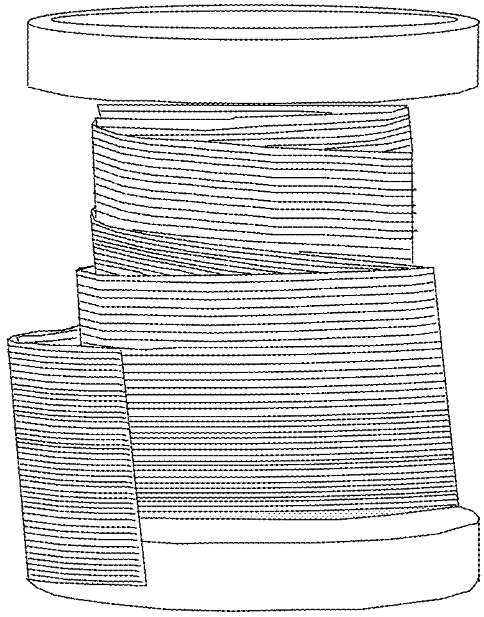
FIG. 4D is a perspective view of a spool of continuous CNT fiber ribbon or tape.
Figure 5A:
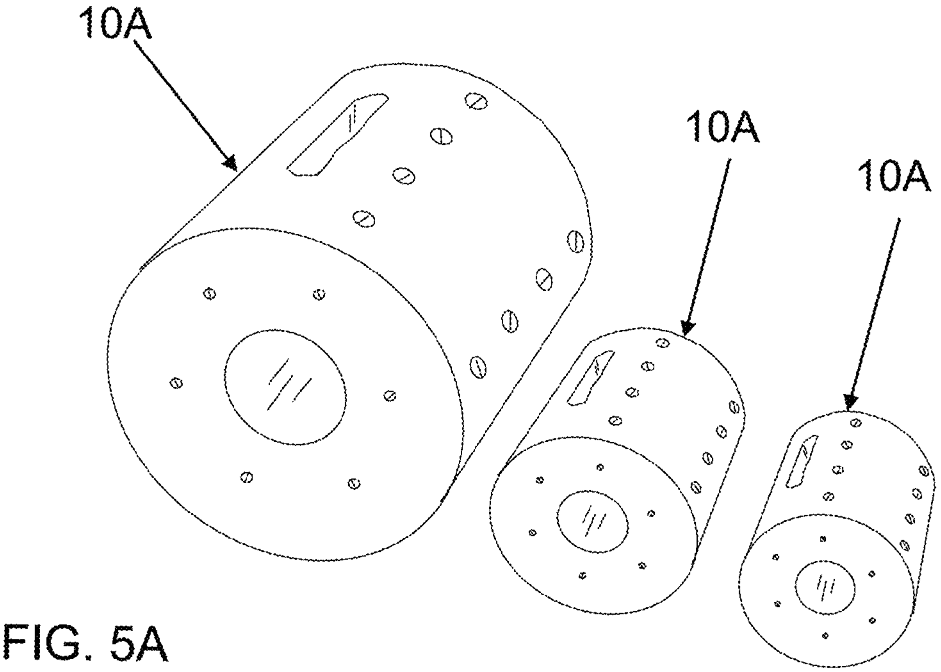
FIG. 5A is a perspective view of first exemplary embodiment of a vacuum electronic device (VED) according to the present invention, wherein, more specifically, the VED is a magnetron.
Figure 5B:
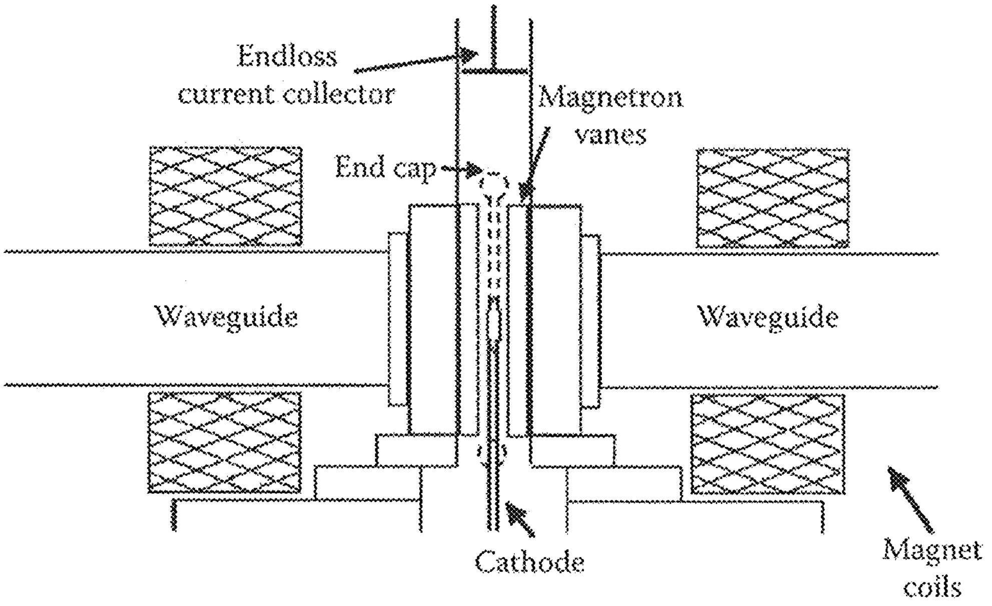
FIG. 5B is a diagrammatic view of the magnetron of FIG. 5A.
Figure 5C:
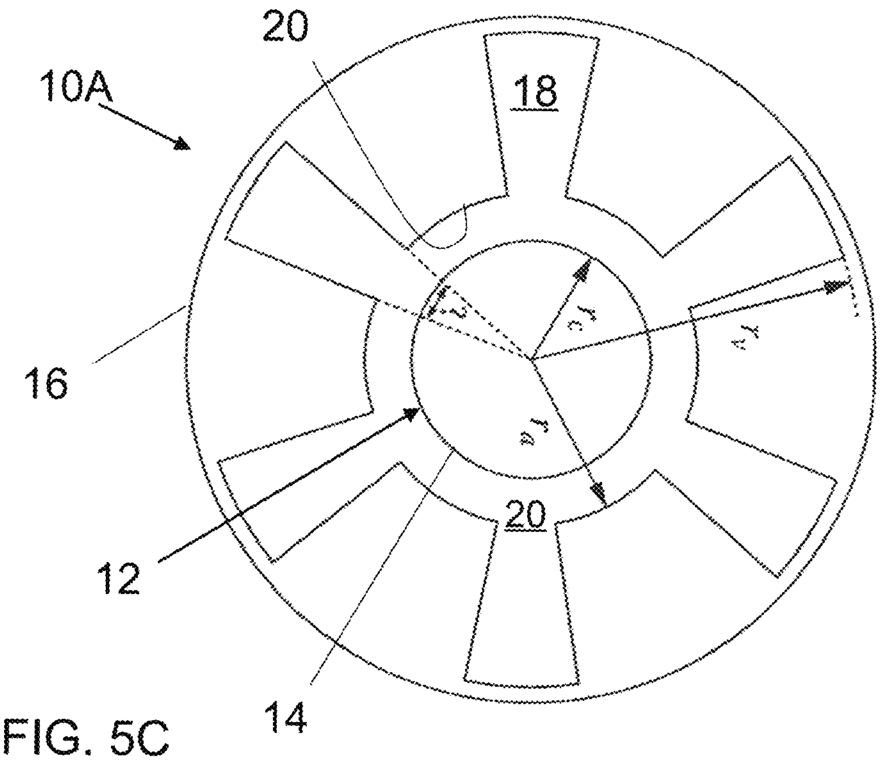
FIG. 5C is a diagrammatic view of an anode and an FE cathode of the magnetron of FIGS. 5A and 5B.
Figure 5D:
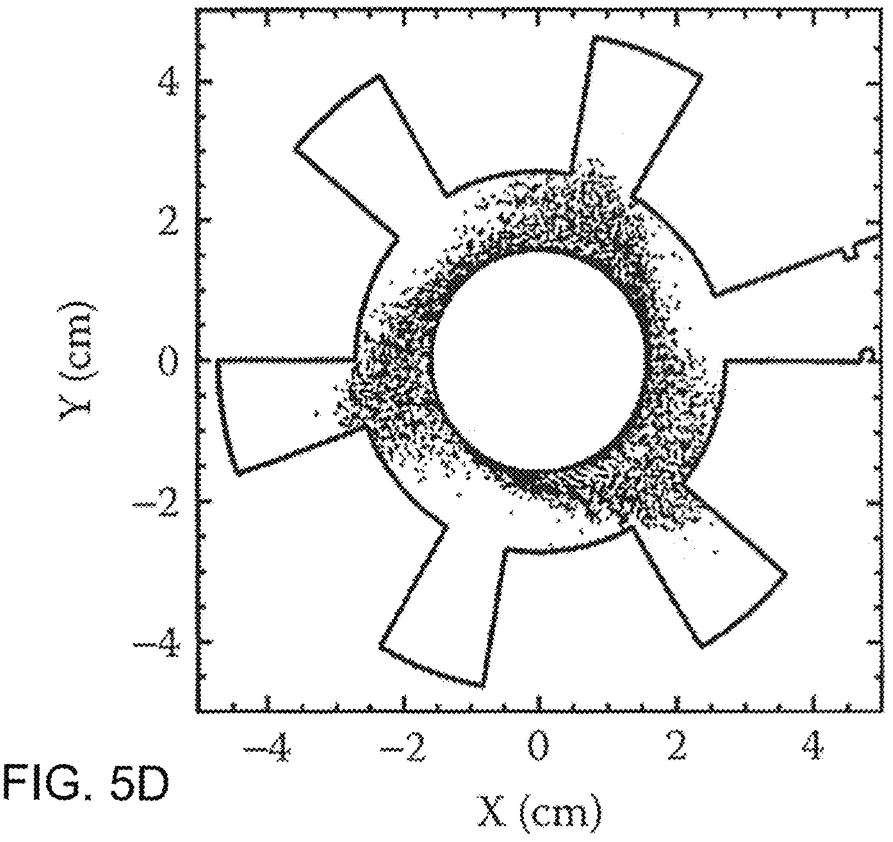
FIG. 5D shows a simulated electrode emission pattern from the FE cathode of the magnetron of FIGS. 5A to 5C.

FIGS. 5A to 5D show a first exemplary vacuum electronic device (VED) 10A, that is, a device that generates electromagnetic waves. The illustrated VED can include an electrode 12 according to the present invention. More specifically, the exemplary VED 10A is a relativistic magnetron which is a high-power VED and the electrode 12 according to the present invention is a field emission (FE) cathode 14. It is noted, however, that any other suitable type of VED 10A or the like can alternatively utilize the electrode 12 according to the present invention and/or that the electrode 12 according to the present invention can be any other suitable type of electrode. The illustrated VED 10A is a cylindrical-type relativistic magnetron having the cylindrical-shaped FE cathode 14 and a hollow cylindrical-shaped anode 16 positioned around the FE cathode 14. Formed within the inner circumference of the anode 16 are equal-spaced cavities 18. Openings connect the anode central opening 19 with the cavities 18. Located between the cathode 14 and the anode 16 is an interaction space 22, where the FE cathode has a radius ($r_c$) which is smaller than a radius ($r_a$) of the anode central opening 19. The cavities 18 extend over angle i from the center to the vane radius ($r_v$). The FE cathode 14 emits electrons outward into the interaction space 22. FIG. 5D shows a simulated electron emission pattern from the FE cathode 14. Such VEDs TOA can operate at frequencies of several hundred MHz to several GHz and, depending on size and other factors, can produce hundreds of megaWatts or more. FIGS. 5A to 5D are from J. Benford, J. A. Swegle, and E. Schamiloglu, High Power Microwaves, CRC Press, Boca Raton, Florida, 2007, pages 269, 282, 263, and 266 respectively, the disclosure of which is expressly incorporated herein in its entirety by reference.

Figure 5E:
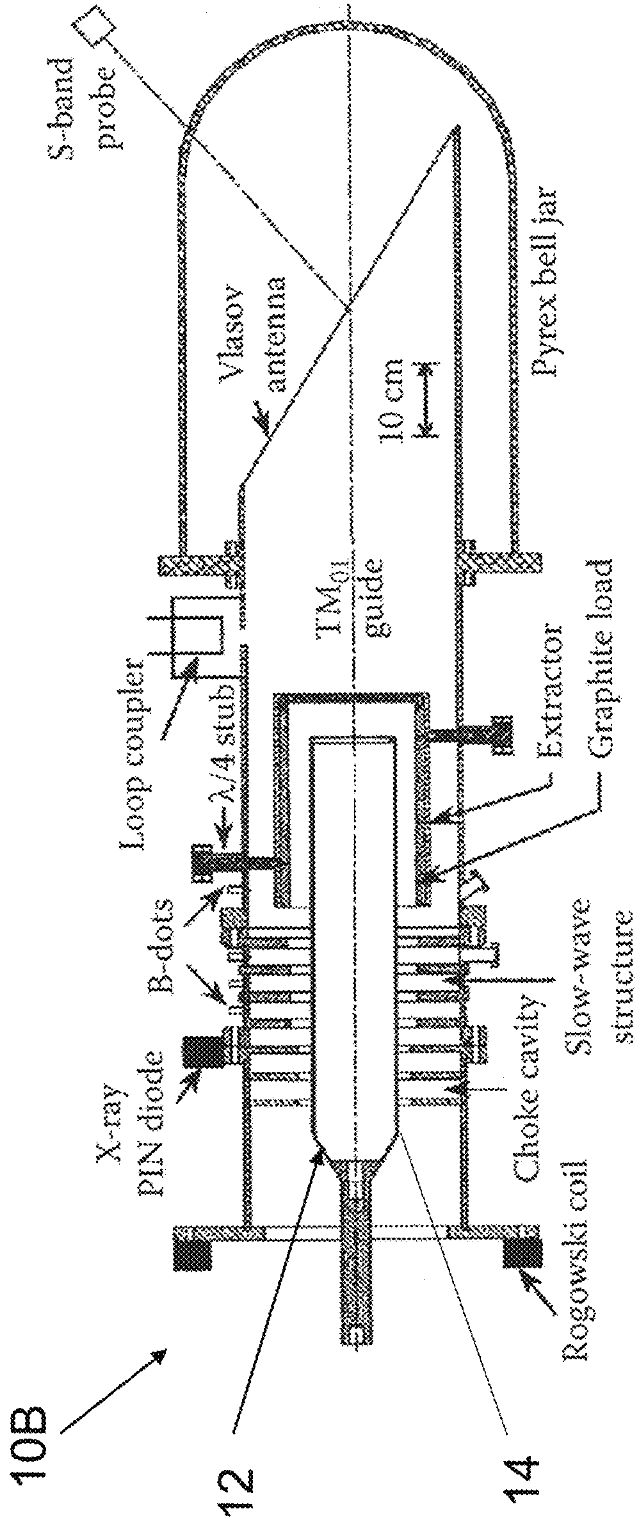
FIG. 5E is a diagrammatic view of a second exemplary embodiment of a VED according to the present invention, wherein, more specifically, the VED is a magnetically insulated line oscillator (MILO).

FIG. 5E shows a second exemplary VED 10B. The illustrated VED 10B can include an electrode 12 according to the present invention. More specifically, the exemplary VED 10B is a relativistic magnetically insulated line oscillator (MILO) which is a high-power VED and the electrode 12 according to the present invention is a field emission (FE) cathode 14. It is noted, however, that any other suitable type of VED 10B or the like can alternatively utilize the electrode 12 according to the present invention and/or that the electrode 12 according to the present invention can be any other suitable type of electrode. FIG. 5E is from M. D. Haworth et al., IEEE Trans. Plasma Science, volume 26, page 312, 1998, the disclosure of which is expressly incorporated herein in its entirety by reference.

Figure 6A:
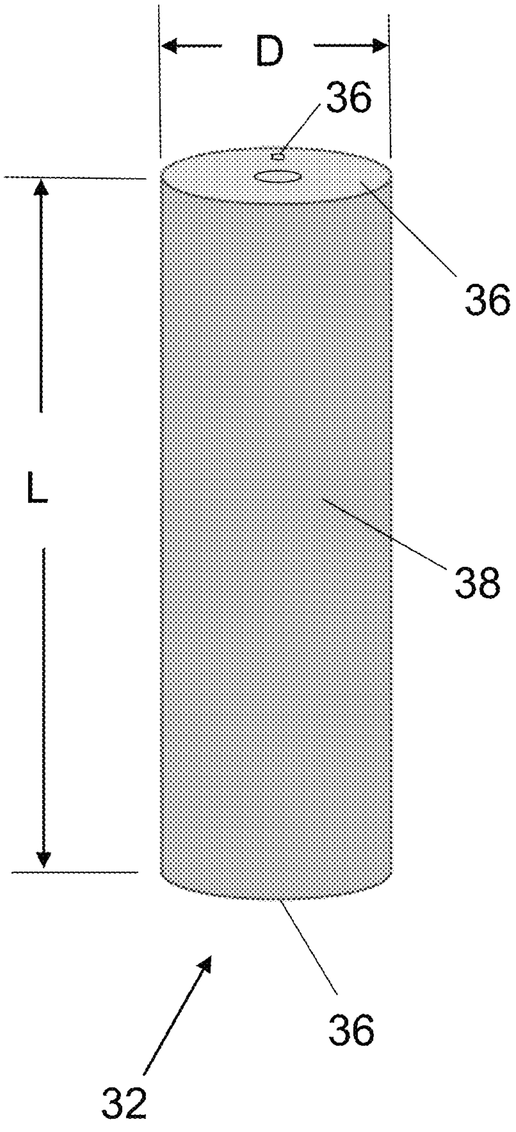
FIG. 6A is a perspective view of an electrically-conductive substrate for the FE cathode of the magnetron of FIG. 5A according to a first embodiment of the present invention.
Figure 6B:
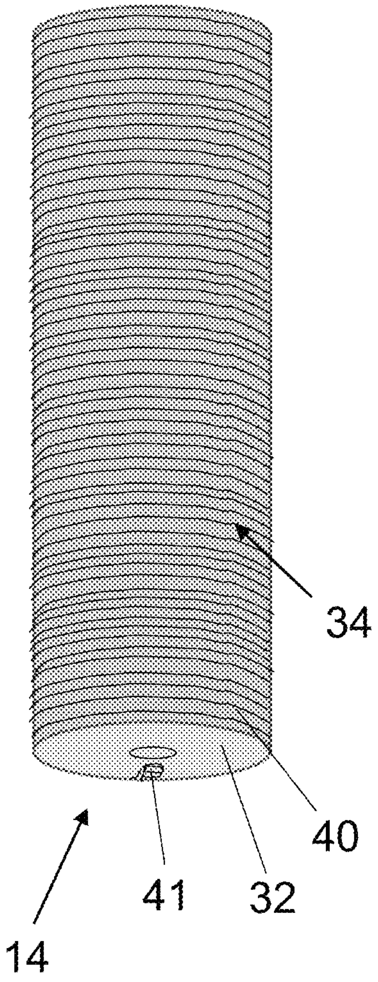
FIG. 6B is a perspective view of an FE cathode of the magnetron of FIG. 5A and the MILO of FIG. 5E and utilizing the electrically-conductive substrate of FIG. 6A and a continuous CNT fiber braided yarn.
Figure 6C:
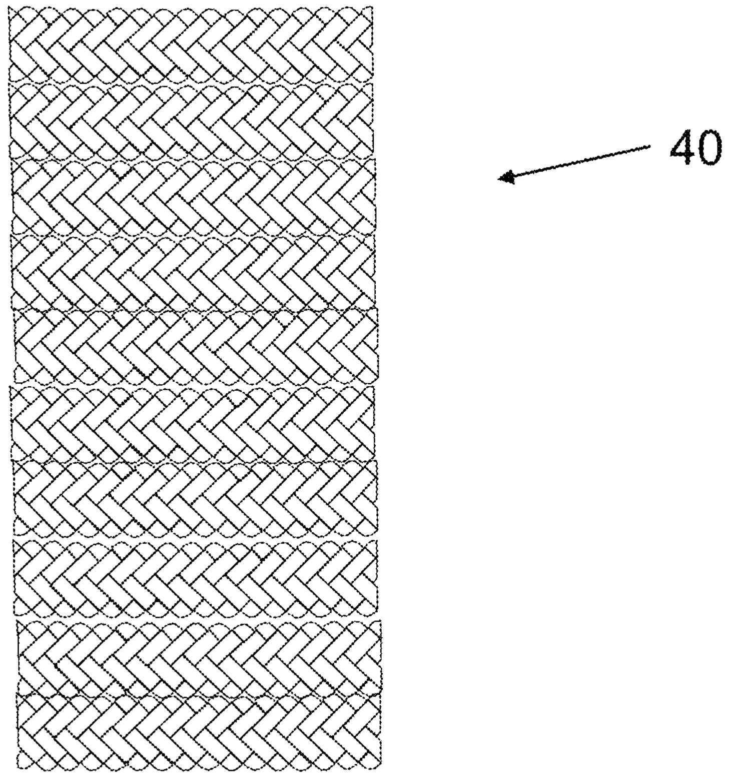
FIG. 6C is an enlarged view of a portion of the FE cathode of FIG. 6B showing the continuous CNT fiber braided yarn wound around the side surface of the electrically-conductive substrate to form a plurality of tight loops.
Figure 6D:
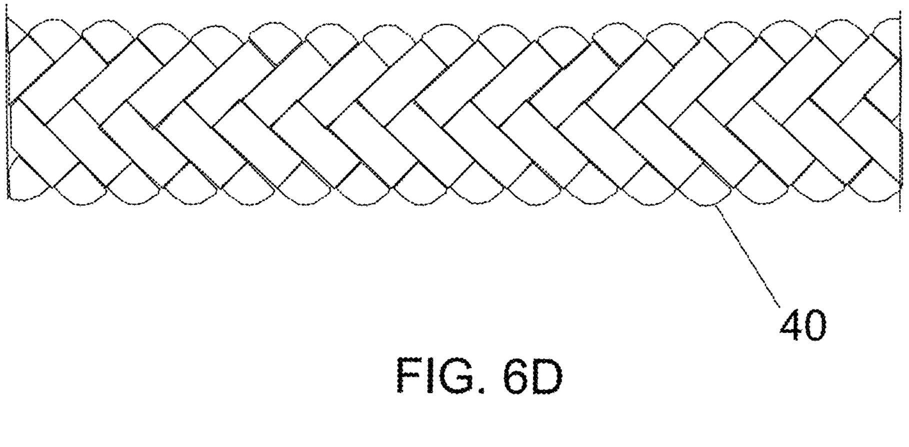
FIG. 6D is an enlarged view of a portion of the continuous CNT fiber braided yarn of FIG. 6C.
Figure 6E:
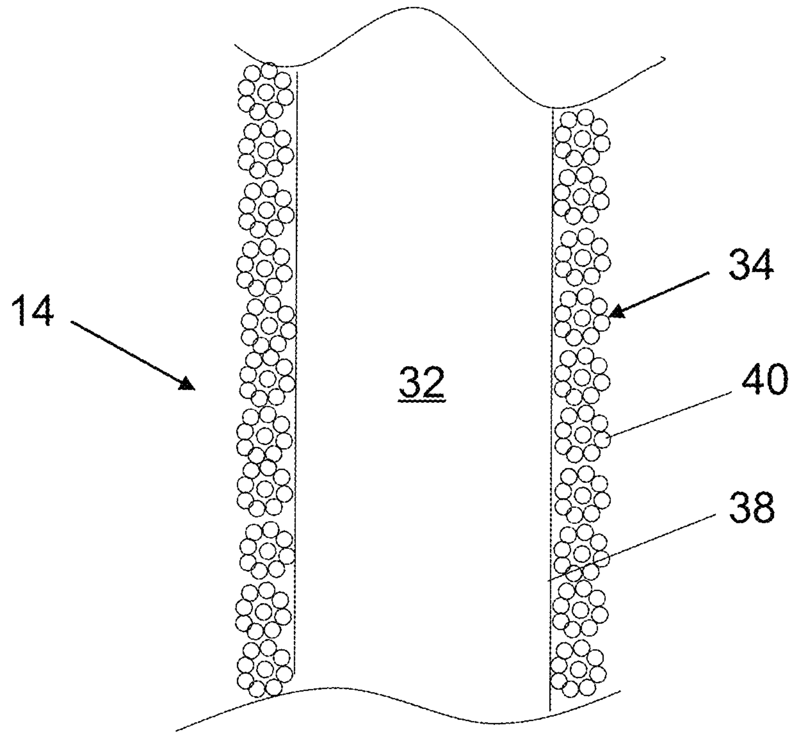
FIG. 6E is a fragmented cross-sectional view of the FE cathode of FIG. 6B taken through a central vertical plane.

FIGS. 6A to 6E show the FE cathode 14 of the above-described VED 10. The FE cathode 14 includes an electrically-conductive substrate 32, and at least one continuous carbon nanotube (CNT) fiber 34 wound in tension around at least a portion of the electrically-conductive substrate 32 and secured in electrically-conductive contact with the electrically-conductive substrate 32. The illustrated electrically-conductive substrate 32 is cylindrical-shaped as best shown in FIG. 6A and has opposed circular-shaped and flat end faces 36 having the same diameter (D) and an outer circumferential surface 38 with the same diameter (D) as the end faces 36 and extending between the end faces 36 for length (L). Each illustrated end face 36 is provided with a suitably sized threaded hole 39 located near the edge of the end face 26. It is noted that the threaded holes 39 can be eliminated if other means for securing ends of the continuous CNT fiber 34 are utilized as described in more detail below. It is also noted that the electrically-conductive substrate 32 can alternatively have any other suitable shape and/or configuration. The illustrated electrically-conductive substrate 32 has a diameter of about 1 inch and a length of about 6 inches. However, the electrically-conductive substrate 32 can alternatively have any other suitable size. The illustrated electrically-conductive substrate 32 is comprised of stainless steel. However, the electrically-conductive substrate 32 can alternatively comprise any other suitable metal and/or any other suitable electrically-conductive material.

Figure 6F:
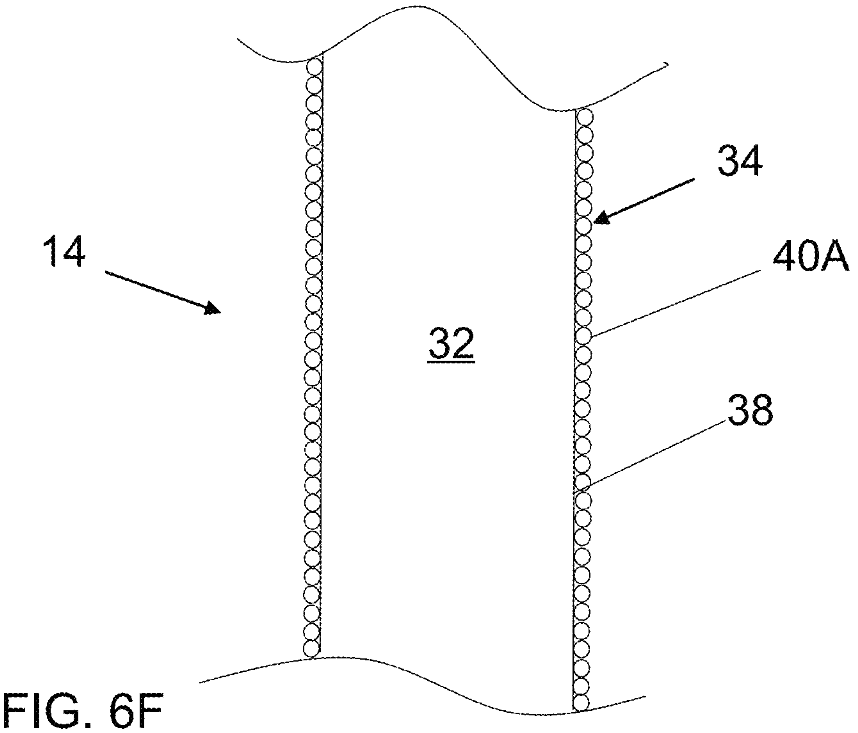
FIG. 6F is a fragmented cross-sectional view similar to FIG. 6E but showing an alternative embodiment of the FE cathode of FIG. 6B wherein the continuous CNT fiber braided yarn is replaced with a single continuous CNT fiber filament.

FIG. 6F illustrates an alternative embodiment of the FE cathode 14 of FIGS. 6A to 6E wherein the at least one continuous CNT fiber 34 is in the form of a single continuous CNT fiber filament 40A in place of a continuous CNT fiber braided yarn 40 shown in FIGS. 6A to 6E. This alternative embodiment illustrates that the at least one continuous CNT fiber 34 can have any other suitable form.

The illustrated continuous CNT fiber 34 is a 1 mm diameter single continuous CNT fiber braided yarn 40 comprised of a plurality of continuous CNT fiber filaments, threads, and/or yarns that are braided together in a suitable manner. For example, but not limited to, the continuous CNT fiber braided yarn 40 can be Galvorn CNT braided yarn available from Dexmat, Inc. of Houston, Texas. Galvom CNT braided yarn is available in diameters of 800 and 1000 m and lengths ranging from 1 to 100 m. It is noted that if desired more than one of the continuous CNT fiber braided yarn 40 or other continuous CNT fiber can be utilized in series and/or parallel. It is also noted that the at least one continuous CNT fiber 34 can be of any other suitable type such as, for example but not limited to, one or more of a continuous CNT fiber filament, a continuous CNT fiber thread or yarn, a continuous CNT film or tape, and a continuous CNT fiber fabric.

In this specification and in the claims, the term "continuous CNT fiber" has the meaning of a macroscopic product of CNTs including, but not limited to, a continuous CNT fiber filament, continuous CNT fiber thread or yarn, a continuous CNT fiber braided yarn, a continuous CNT fiber ribbon or tape, a continuous CNT fiber fabric, and the like. In this specification and the claims, the terms "continuous CNT fiber filament" has the meaning of a macroscopic product of CNTs comprised of a single continuous fiber that is not twisted, braided, or plied. In this specification and the claims, the terms "continuous CNT fiber thread" and "continuous CNT fiber yarn" each have the meaning of a plurality of continuous CNT fiber filaments that are twisted, braided, or plied to bind the continuous CNT filaments together. In this specification and the claims, the term "continuous CNT fiber braided yarn" has the meaning of a plurality of continuous CNT fiber filaments, threads, and/or yarns that are braided to bind the filaments and/or yarns together. In this specification and the claims, the term "continuous CNT fiber ribbon, film, or tape" has the meaning of a macroscopic CNT product comprised of a plurality of continuous fully densified CNT fibers forming continuous sheet. In this specification and the claims, the term "continuous CNT fiber fabric" has the meaning of a macroscopic CNT product formed by weaving, knitting, or embroidering continuous CNT fibers together.

The illustrated at least one continuous CNT fiber 34 is wound around the circumferential surface 38 of the electrically-conductive substrate 32 in a helical manner to form a series of adjacent emitter loops located side-by-side along the length (L) of the electrically-conductive substrate 32. Adjacent loops are preferably in contact with one another without gaps to form a fully densified surface. The illustrated FE cathode 14 has the single continuous CNT fiber braided yarn 40 wound around essentially the entire length (L) of the electrically-conductive substrate 32. However, it is noted that alternatively the single continuous CNT fiber 34 can be wound around a smaller portion of the length (L) of the electrically-conductive substrate 32. It is also noted that a plurality of the continuous CNT fibers 34 can alternatively be wound around separate portions of the length (L) of the electrically-conductive substrate 32.

The illustrated at least one continuous CNT fiber 34 is wound or pulled around the circumference of the electrically-conductive substrate 32 under tension so that at least one continuous CNT fiber 34 is wound tight in tension around the electrically-conductive substrate 32. Ends of the at least one continuous CNT fiber 34 are secured by mechanical fasteners 41 located in the threaded holes 39 to maintain the at least one continuous CNT fiber 34 in tension around the electrically-conductive substrate 32. It is noted that the mechanical fasteners 41 can be removed if desired once the at least one continuous CNT fiber 34 is secured in tension around the electrically-conductive substrate 32 with an electrically conductive bond as described in more detail hereinbelow. Secured under tension, each loop of the continuous CNT fiber 34 preferably engages the circumferential surface 38 of the electrically-conductive substrate 32 and each loop of the continuous CNT fiber 34 preferably engages the adjacent loops of the continuous CNT fiber 34 to form a fully densified and cylindrically-shaped emitting surface. Wound onto the electrically-conductive substrate 32 in this manner, the illustrated 1 mm diameter continuous CNT fiber braided yarn 40 forms a 1 mm thick layer of the continuous CNT fiber 834 on the circumferential surface 38 of the conductive substrate 32.

The at least one continuous CNT fiber 34 is secured to the electrically-conductive substrate 32 by a conductive bond so that each of the loops of the at least one CNT continuous fiber 34 are secured to the electrically-conductive substrate 32 in a manner in which electricity can freely flow therebetween. The conductive bond is preferably formed using vacuum brazing. However, it is noted that the conductive bond can alternatively comprise one or more conductive adhesives such as, for example but not limited to, a carbon-based epoxy, a silver epoxy, a CNT-containing adhesive, a nanocarbon-containing adhesive, an electroplating bond, and/or the like.

For use in the VED 10A, 10B, the FE cathode 14 must survive voltages of up to 500 kV or more without shorting out. Thus, it is important that there is adequate contact between the at least one continuous CNT fiber 34 and the electrically-conductive substrate 32 and/or between adjacent loops of the at least one continuous CNT fiber 34. In addition to or instead of securing the at least one continuous CNT fiber 34 to the electrically-conductive substrate 32 while the at least one continuous CNT fiber 34 is under tension, the at least one continuous CNT fiber 34 can be secured to the electrically-conductive substrate 32 while the at least one continuous CNT fiber 34 is under compression. For example, but not limited to, a compressive sleeve or a plurality of clamping members can compress the at least one continuous CNT fiber 34 against the electrically-conductive substrate 32 while the at least one continuous CNT fiber 34 is bonded to the electrically-conductive substrate 32.

FIGS. 7A and 7B illustrate an exemplary fiber winding machine 42 which can be utilized to wind the at least one continuous CNT fiber 34 around the circumference of the electrically-conductive substrate 32 under a desired uniform tension. The illustrated fiber winding machine 42 has a payoff or unwind zone 44, followed by a tension control zone 46, and finally a take-up or wind zone 48. The illustrated payoff zone 44 is configured to receive a roll or spool of the desired continuous CNT fiber 34. The free end of the desired continuous CNT fiber 34 is fed from the payoff zone 44 to the tension control zone 46 such that when the continuous CNT fiber 34 is pulled, it unwinds or pays off of the roll or spool. The tension control zone 46 includes a driver roll and dancer along with a tension meter to ensure that the continuous CNT fiber 34 is wound onto the electrically-conductive substrate 32 in the take-up zone 48 in a desired manner under a desired uniform tension. The continuous carbon fiber 34 is fed from the tension control zone 46 to take-up roll within the take-up zone 48. The electronically-conductive substrate 32 is mounted on the take-up roll to receive the continuous CNT fiber 34 thereon. The take-up roll is mounted onto a horizontal traverse which laterally moves the take-up roll, and the attached electrically-conductive substrate 32, so that the continuously CNT fiber 34 is spaced out along the length of the electrically-conductive substrate 32 in a desired manner. It is noted that any other suitable type and/or configuration of fiber winding machine 42 can alternatively be utilized.

Figure 8A:
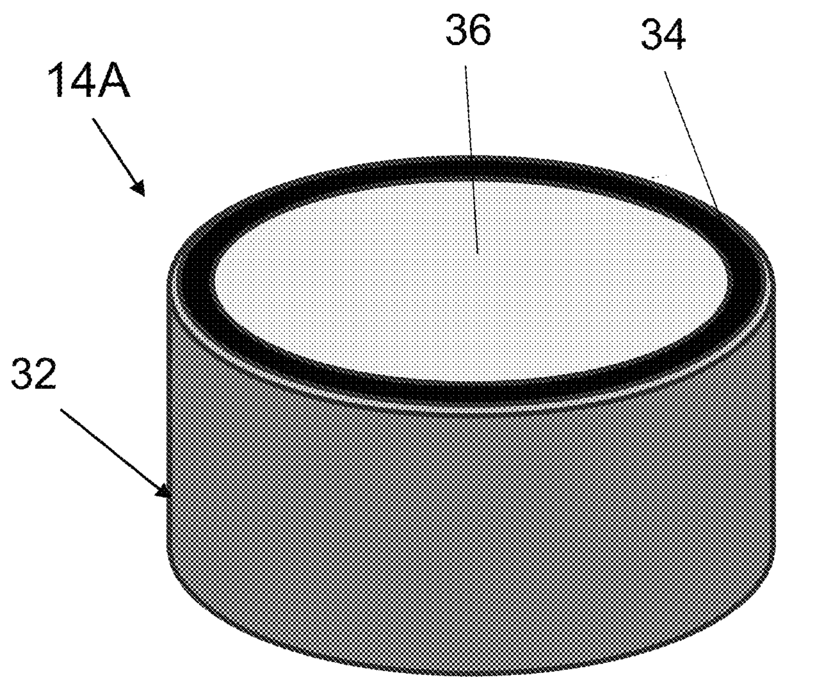
FIG. 8A is a perspective view of an electrode according to a second embodiment of the present invention, wherein a continuous CNT fiber is wound around an end face of a cylindrical-shaped electrically conductive substrate.
Figure 8B:
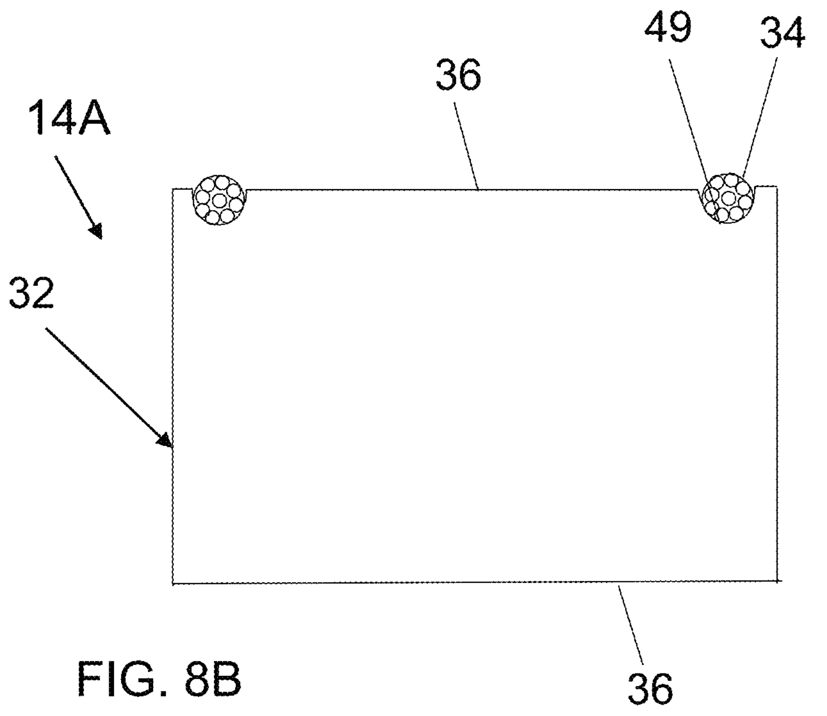
FIG. 8B is a cross-sectional view of the electrode of FIG. 8A taken along a vertical plane through the centerline of the electrode.

FIGS. 8A and 8B illustrate an FE cathode 14A according to a second embodiment of the present invention that is substantially the same as the FE Cathode 14 of the first embodiment of the invention except that the continuous CNT fiber 34 forms a ring-shaped emitting surface rather than the cylindrical-shaped emitting surface of the first embodiment. The illustrated FE cathode 14A includes an electrically-conductive substrate 32 in the shape of a cylinder as in the first embodiment of the present invention. However, the continuous CNT fiber 34 is pulled or wound around the flat end-face 36 of the electrically-conductive substrate 32 to form the ring-shaped emitting surface rather than wound or pulled around the outer circumferential surface 38 of the electrically-conductive substrate 32 to form the cylindrical-shaped emitting surface of the first embodiment. The illustrated flat end-face 36 of the electrically-conductive substrate 32 is provided with a circular-shaped groove 49 located near the outer edge of the flat end face 36. The groove 49 is sized and shaped to closely receive the continuous CNT fiber 34 therein. The illustrated continuous CNT fiber 34 is a continuous CNT fiber braded yarn havening a diameter of 1 mm, so the illustrated groove has a diameter of about 1 mm to closely receive the continuous CNT fiber braded yarn. The continuous CNT fiber 34 is tightly wound or pulled into the groove 49 in tension so that continuous CNT fiber 34 contacts the electrically-conductive substrate 32 within the groove 49. Additionally or alternatively, the continuous CNT fiber 34 can be in compression within the groove 49 by compressing the continuous CNT fiber when bonding the continuous CNT fiber 34 to the electrically-conductive substrate 32. The illustrated continuous CNT fiber 34 forms a single loop. However, the continuous CNT fiber 34 can alternatively be wound or pulled to form a plurality of tight loops in a spiral-like manner when the continuous CNT fiber 34 has a smaller diameter and/or when a wider ring-shaped emitting surface is desired. It is noted that the electrode 12A can alternatively have any other suitable configuration such as, for example, but not limited to, the illustrated continuous CNT fiber 34 can be of any other suitable type, and/or, the ring-shaped emitting surface can be formed on an electrically-conductive substrate 32 having a different shape.

Figure 9A:
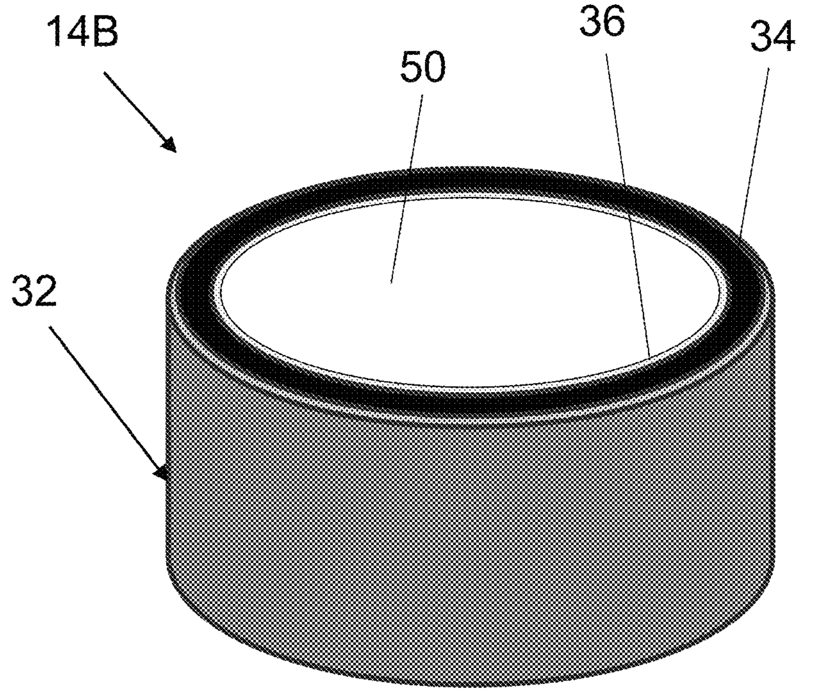
FIG. 9A is a perspective view of an electrode according to third embodiment of the present invention, wherein similar to the electrode of FIG. 8A except that the cylindrical-shaped electrically conductive substrate is a hollow cylinder.
Figure 9B:
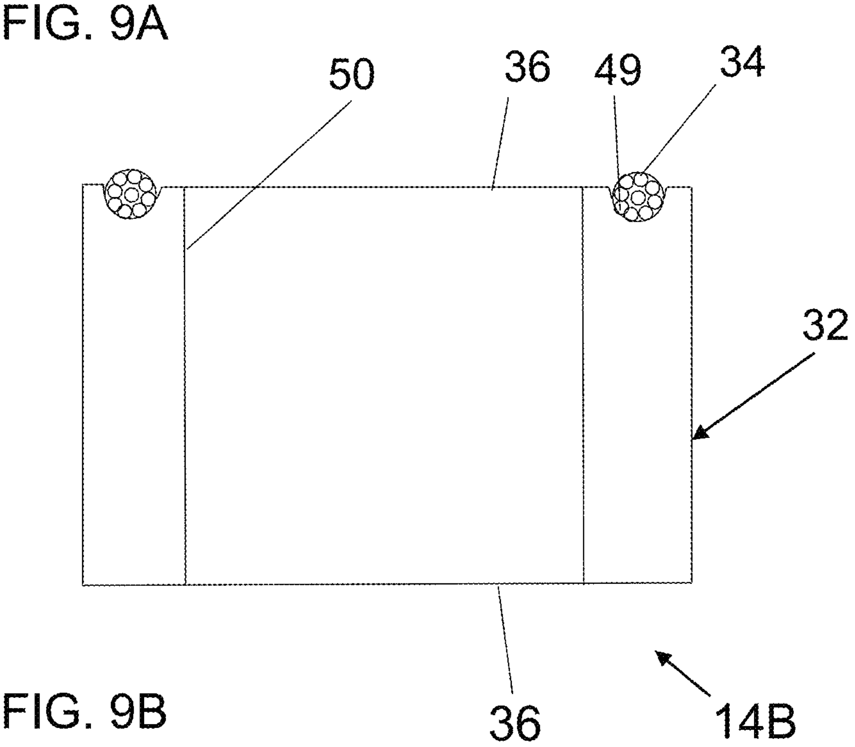
FIG. 9B is a cross-sectional view of the electrode of FIG. 9A taken along a vertical plane through the centerline of the electrode.

FIGS. 9A and 9B illustrate an FE cathode 14B according to a third embodiment of the present invention that is substantially the same as the FE cathode 14A of the second embodiment of the present invention except that the electrically-conductive substrate 32 is a hollow cylinder rather than a solid cylinder. The illustrated hollow cylinder electrically conductive substrate 32 has an axially-extending passage 50 that is circular in cross-section and extends entirely between the opposed end faces 36. It is noted that the electrically-conductive substrate 32 can alternatively have any other suitable shape and/or configuration.

Figure 10:
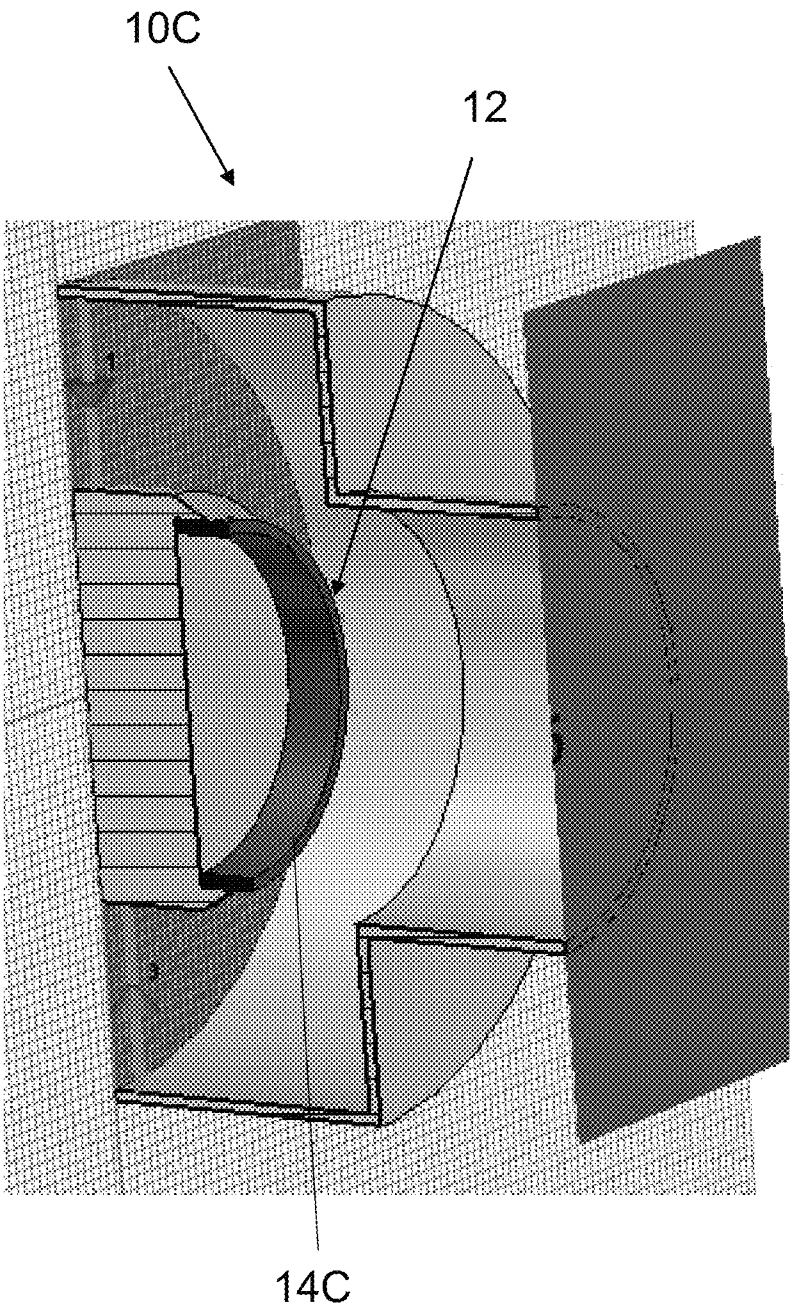
FIG. 10 is a diagrammatic view, in cross section, of electron gun for a third exemplary embodiment of a VED according to the present invention, wherein, more specifically, the VED is a backward wave oscillator (BWO).

FIG. 10 shows an electron gun having a hoop-shaped electrode for a third exemplary VED 10C. The illustrated electron gun can include an electrode 12 according to the present invention. More specifically, the third exemplary VED 10C is a relativistic backward wave oscillator (BWO) which is a high-power VED and the electrode 12 according to the present invention is a field emission (FE) cathode 14C. It is noted, however, that any other suitable type of VED 10C or the like can alternatively utilize the electrode 12 according to the present invention and/or that the electrode 12 according to the present invention can be any other suitable type of electrode. The term "hoop" is used in this specification and the claims to mean solid toroid which is a closed surface of revolution with a hole in the middle. The closed surface which is rotated can have any suitable shape such as, for example but not limited to, a circle, a rectangle, and the like.

Figure 11A:
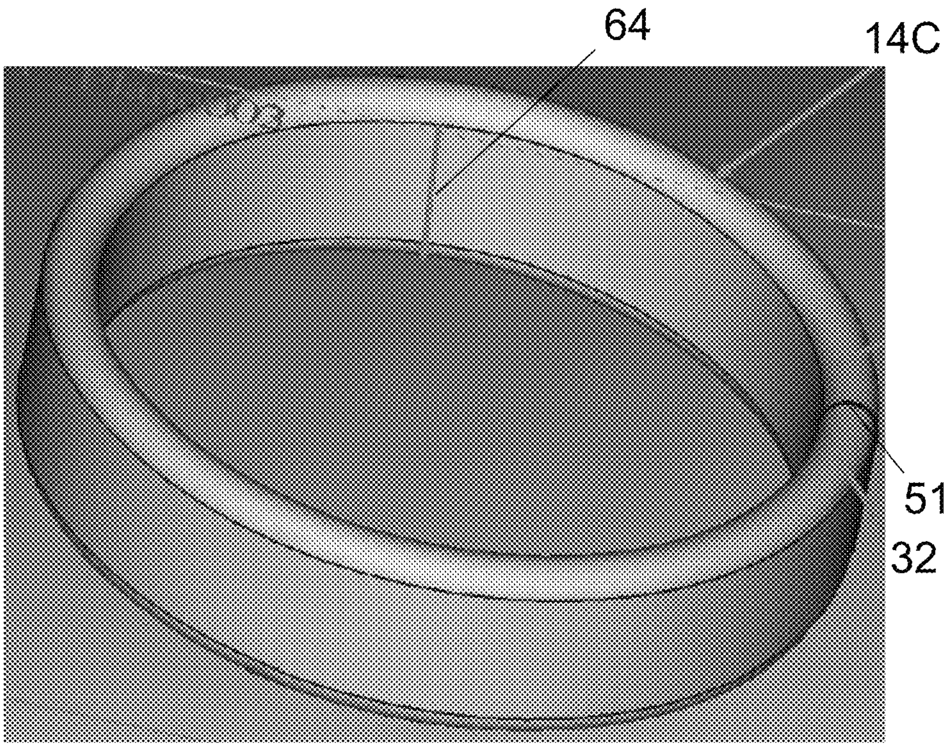
FIG. 11A is a perspective view of an electrode according to a fourth embodiment of the present invention, wherein a continuous CNT fiber is wound around a hoop-shaped electrically conductive substrate is only partially shown and some components are removed for clarity.
Figure 11B:
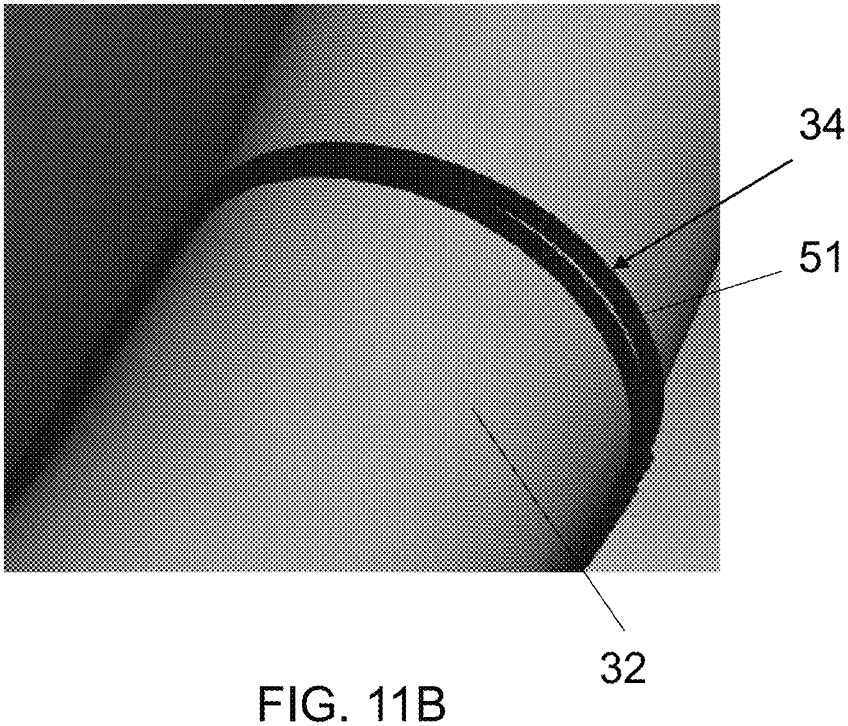
FIG. 11B is an enlarged and fragmented view of a portion of the electrode of FIG. 11A.
Figure 11C:
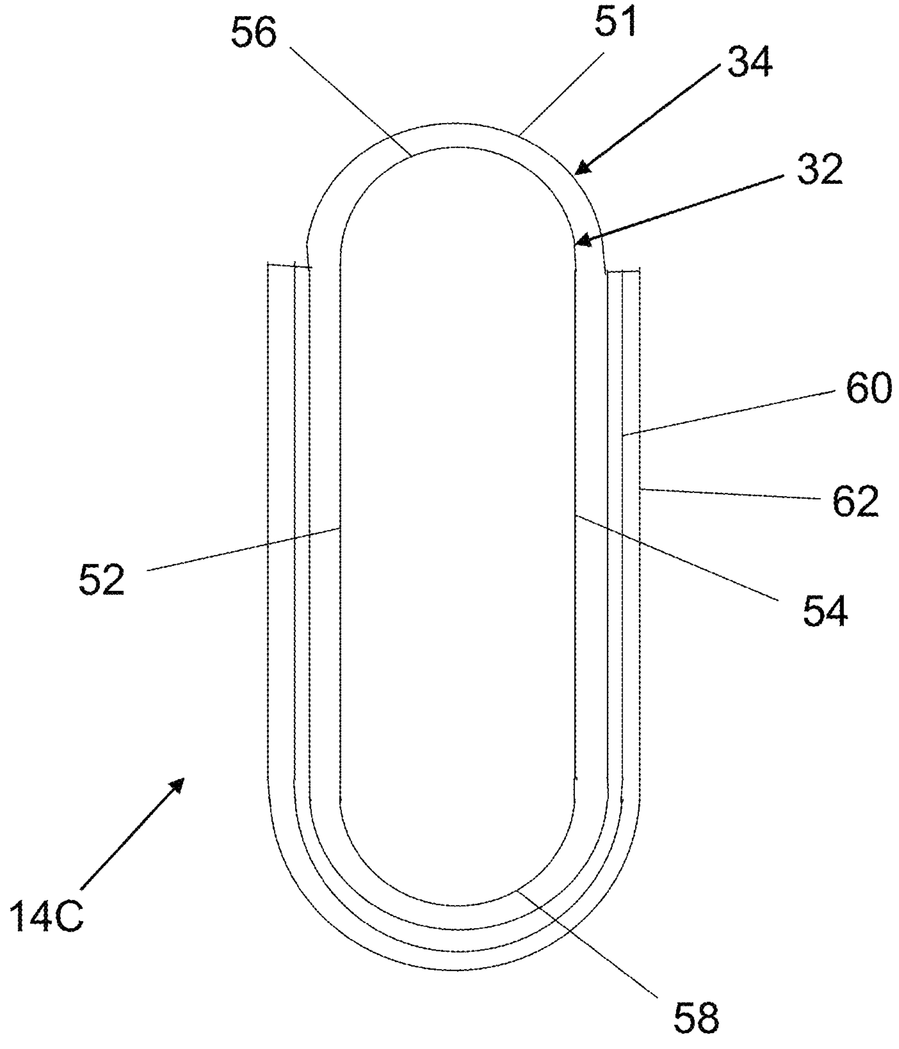
FIG. 11C is a cross-sectional view showing a cross section of the electrode of FIG. 11B with the continuous CNT fiber wound around the electrically conductive substrate.
Figure 11D:
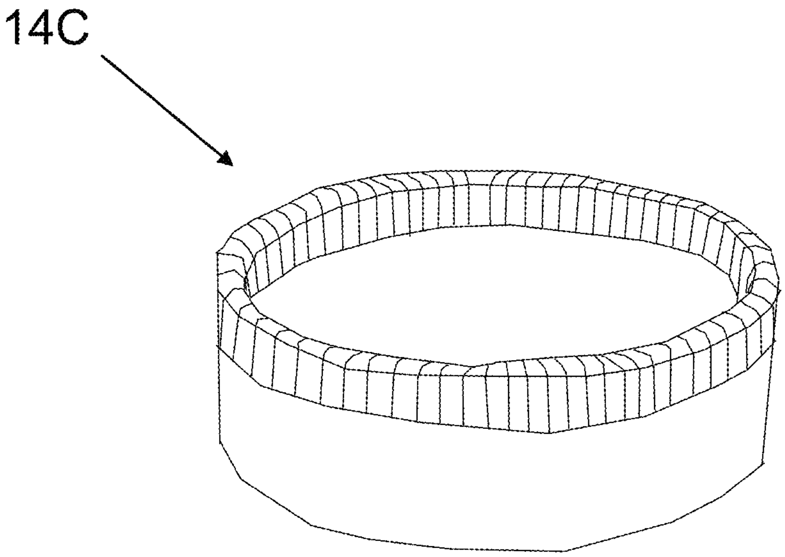
FIG. 11D is a photograph of a perspective view of the hoop-shaped FE cathode of FIG. 11C.
Figure 11E:
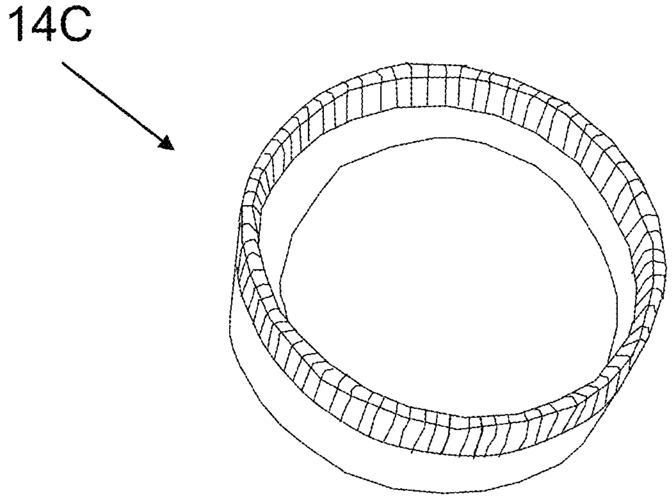
FIG. 11E. is a photograph of a perspective view of the hoop-shaped FE cathode of FIG. 11D.

FIGS. 11A to 11C illustrate a FE cathode 14C according to a fourth embodiment of the present invention that is substantially the same as the FE cathode 14 of first embodiment of the present invention except that the electrically-conductive substrate 32 has (1) a hoop shape rather than a cylinder shape, (2) has an upper toroidal shaped emitting surface rather than the cylindrical shaped emitting surface, and (3) has a single continuous CNT fiber filament 51 secured to the outer surface rather than the single continuous CNT fiber braided yarn or thread 40 of the first illustrated embodiment. It is noted that the at least one continuous CNT fiber 34 can alternatively be of any other suitable type. The cross-section of the illustrated hoop-shaped electrically-conductive substrate 32 has straight inner and outer sides 52, 54 between toroidal or semi-circular upper and lower ends 56, 58. The continuous CNT fiber filament 51 is wrapped or pulled around this cross-section under tension in a tight manner for the full 360 degrees of the hoop-shaped electrically-conductive substrate 32. It is noted that the cross-section of the electrically-conductive substrate 32 can alternatively have any other suitable shape. A layer of nickel plating 60 is provided over the lower portion of the continuous CNT fiber filament 51 up to the bottom edge of the upper toroid 56. The layer of nickel plating 60 preferably has a thickness of about 4 microns. A layer of copper plating 62 is provided over the nickel plating 58 up to the bottom edge of the upper toroid 56. The layer of copper plating 62 preferably has a thickness of about 200 microns. Plated in this manner, the continuous CNT fiber filament 51 is only exposed at the toroidal upper end 56 of the FE cathode 14C. Thus, a fully densified and upper toroid-shaped emitting surface is formed. It is noted that the plating materials can alternatively be any other suitable materials and/or the "plating zone" 64 can alternatively have any other suitable configuration. FIGS. 11D and 11E show the FE cathode IC after the nickel plating 60 is applied. It is noted that the FE cathode 14C according to the fourth embodiment of the present invention can alternatively have any other suitable configuration.

Figure 11F:
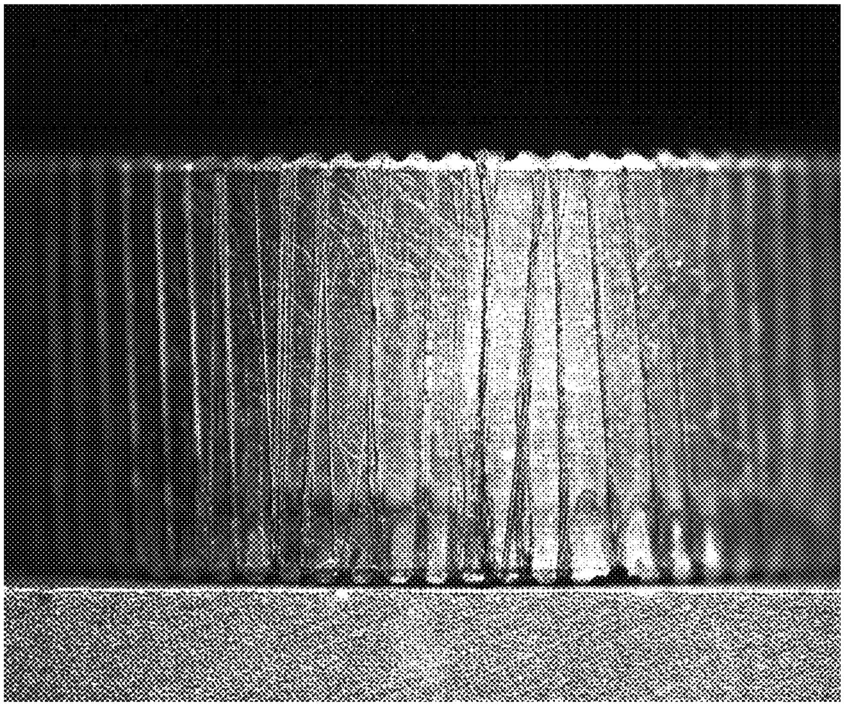
FIG. 11F is a photograph of a partial side view of an alternative hoop-shaped FE cathode similar to the FE cathode of FIG. 11C to 11E.
Figure 11G:
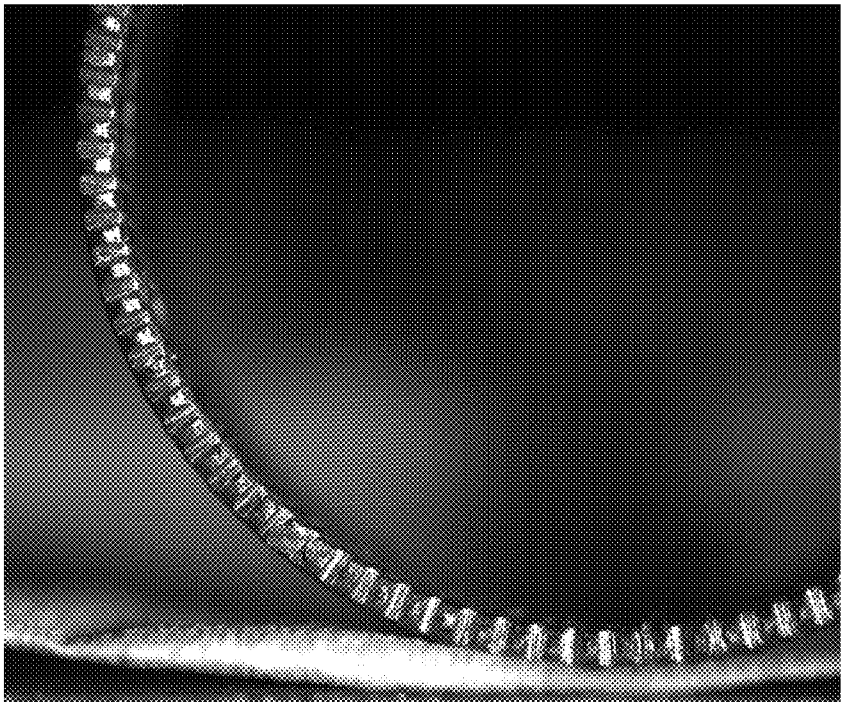
FIG. 11G is a photograph of a partial end view of the alternative hoop-shaped FE cathode of FIG. 11F.

FIGS. 11F and 11G show an alternative hoop-shaped FE cathode similar to the FE cathode 14C according to the fourth embodiment of the invention except that (1) it has a shape of a rectangular toroid, that is, the rotated closed surface is a rectangle, (2) it has spaced-apart grooves formed in the end faces for alignment of the at least one a single continuous CNT fiber filament, and (3) copper plating is provided on both sides. This variation of the hoop-shaped FE cathode illustrates that the FE cathode can have other suitable shapes to provide emitting surfaces of other suitable shapes.

Figure 12:
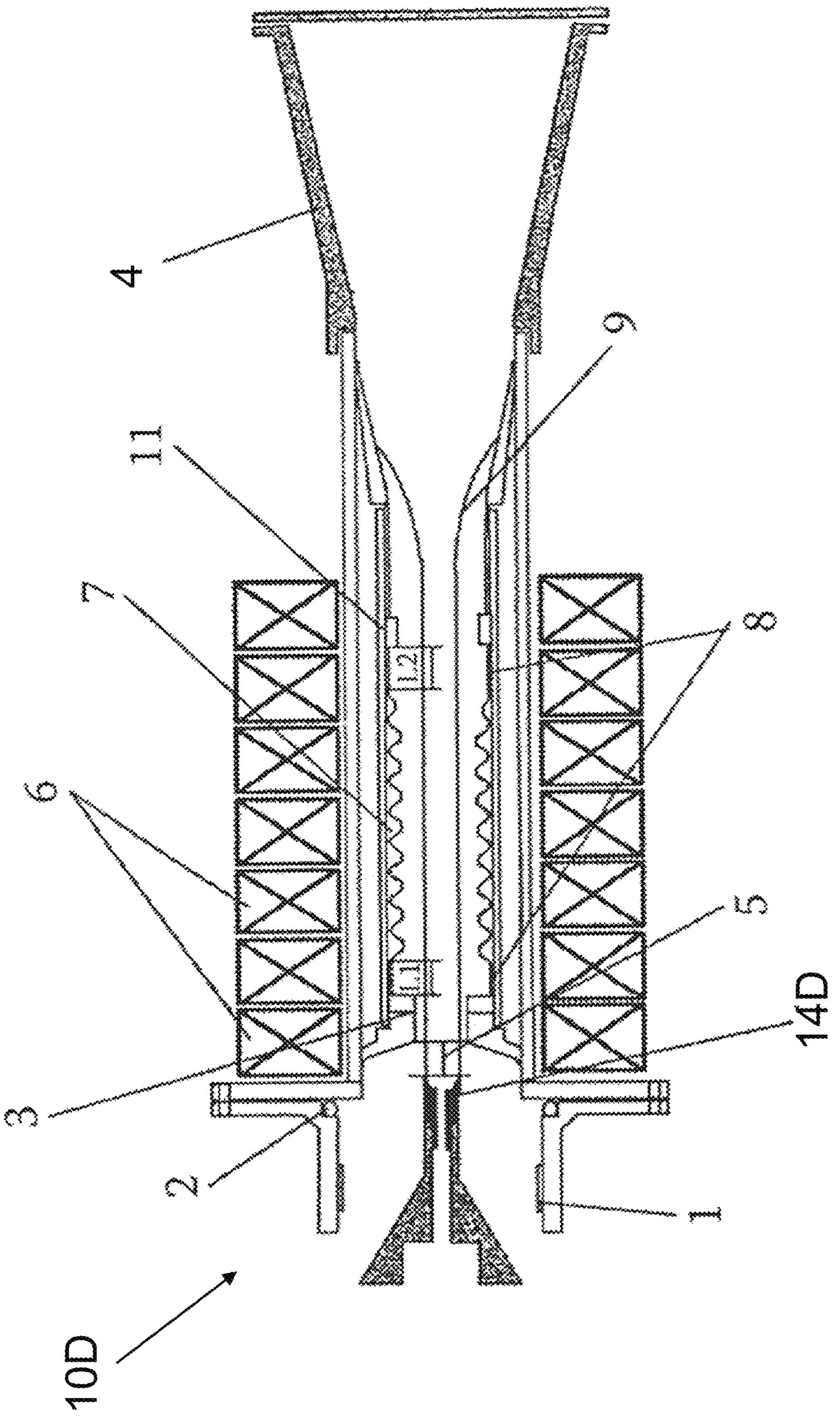
FIG. 12 is a diagrammatic view of a fourth exemplary embodiment of a VED according to the present invention, wherein, more specifically, the VED is a backward wave oscillator (BWO).

FIG. 12 shows a fourth exemplary VED 10D. The illustrated VED 10D can include an electrode 12 according to the present invention. More specifically, the exemplary VED 10D is a relativistic backward wave oscillator (BWO) which is a high-power VED and the electrode 12 according to the present invention is a plate-shaped field emission (FE) cathode 14D. It is noted, however, that any other suitable type of VED 10D or the like can alternatively utilize the electrode 12 according to the present invention and/or that the electrode 12 according to the present invention can be any other suitable type of electrode. FIG. 12 is from L. D. Moreland et al., IEEE Trans. Plasma Science, volume 24, page 852, 1996, the disclosure of which is expressly incorporated herein in its entirety by reference.

A BWO is an amplifying device that is a special type of vacuum tube used to generate microwaves up to the terahertz range and more. An electron gun sends a beam of electrons 9 into a slow wave structure (electromagnetic wave) 7. The electron beam 9 and the electromagnet wave 7 travel in opposite directions. The illustrated BWO includes a capacitive divider 1, followed by a Rogowski coil 2, and a cutoff neck 3. The EF cathode 14D proceeds the cutoff neck 3 by an anode-cathode gap 5. A smooth circular waveguide 8 is provided along the neck 3 and opposite the electron gun for the slow wave structure 7. The illustrated wave guide 8 is provided with shifting lengths L1 and L2. Magnetic field coils 6 are provided radially outward from the waveguide 8. A reflection ring also known as a choke 11 is provided at an end of the wave guide 8 which is followed an output horn antenna 4. The choke 11 is used to block (or reflect back) the high frequency AC signal from the output and allow the DC bias to pass through. It is noted, however, that any other configuration and/or other suitable type of VED 10D or the like can alternatively utilize the FE electrode 14D according to the present invention.

Figure 13A:
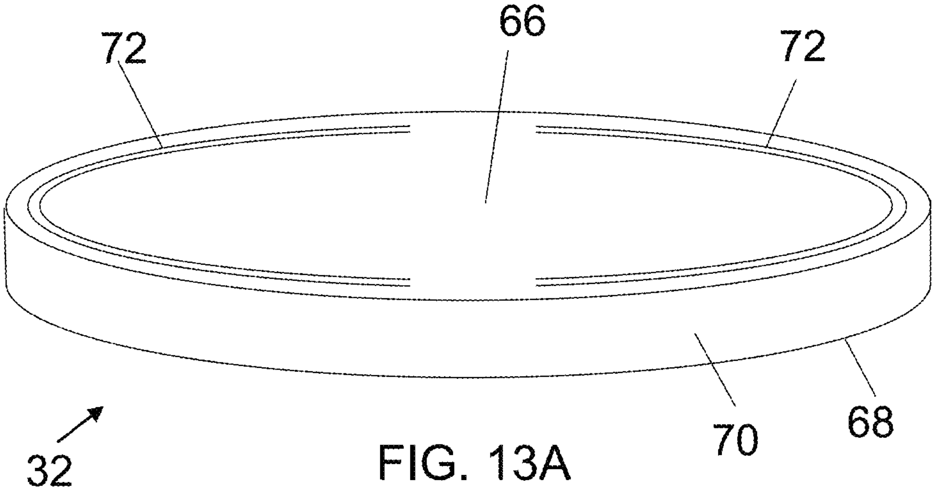
FIG. 13A is a perspective view of a circular plate-shaped electrically-conductive substrate according to a fifth embodiment of the present invention.
Figure 13B:
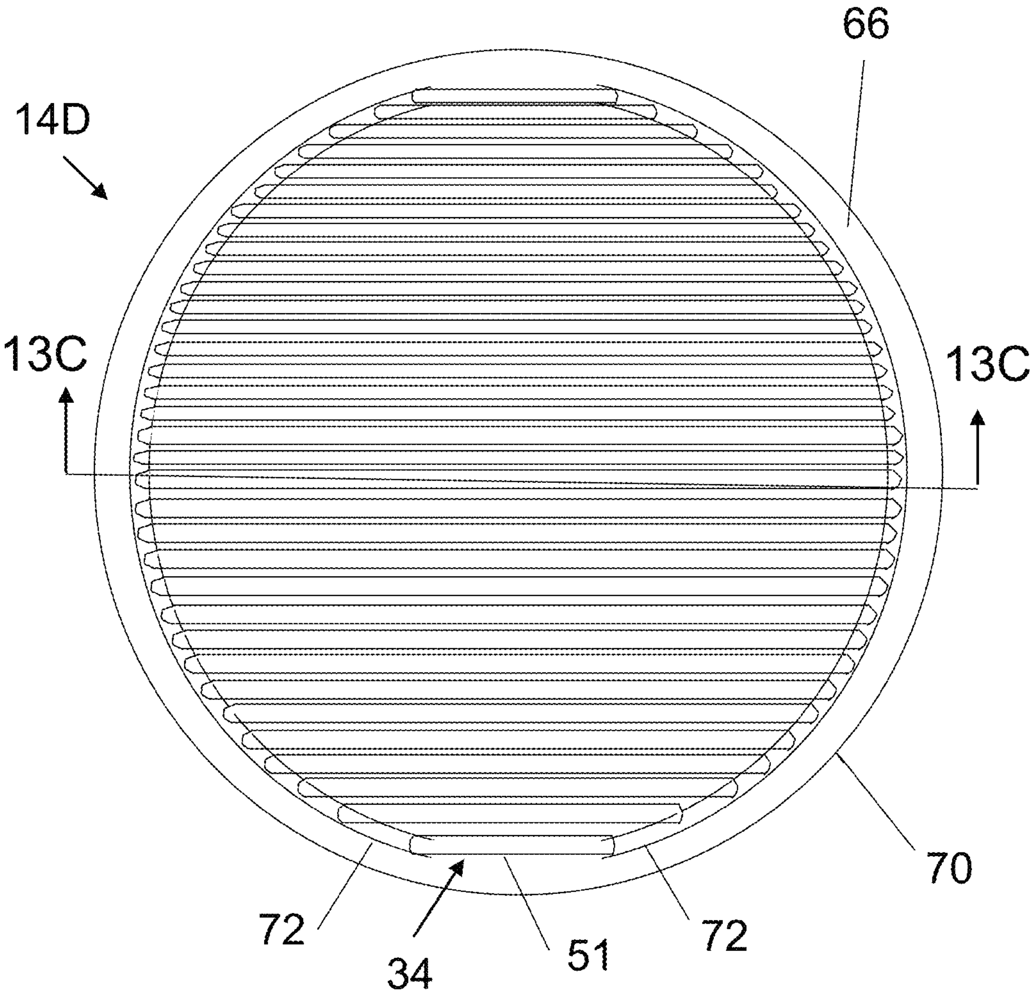
FIG. 13B is a top view of an electrode according to the fifth embodiment of the invention comprising a continuous CNT fiber wound around the circular plate-shaped electrically-conductive substrate of FIG. 13A.
Figure 13C:
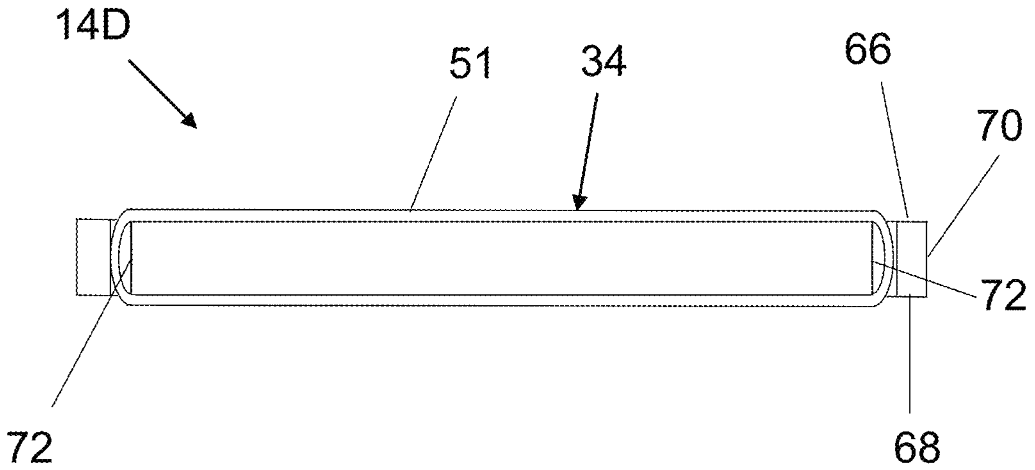
FIG. 13C is cross-sectional view of the electrode of FIG. 13B taken along a line 13C-13C of FIG. 13B.

FIGS. 13A to 13C illustrate a FE cathode 14D according to a fifth embodiment of the present invention that is substantially the same as the FE cathode 14 of the first embodiment of the present invention except that the electrically-conductive substrate 32 is a circular-shaped plate rather than the cylinder, there is a circular emitting surface rather than a cylindrical emitting surface, and the at least one continuous CNT fiber 34 is a single continuous CNT fiber filament 51 rather than a single continuous CNT fiber braided yarn 40. It is noted that the at least one continuous CNT fiber 34 can alternatively be of any other suitable type. The circular-shaped plate substrate 32 has opposed and planar upper and lower surfaces 66, 68 with an outer circumferential surface 70 therebetween. A pair of opposed arc-shape slots 72 extend entirely through the substrate 32 between the upper and lower surfaces 66, 70. The illustrated slots 72 are nearly a semi-circle and located near the outer edge of the upper and lower surfaces 66, 68. The continuous CNT fiber filament 51 is wrapped through the slots 72 and around the circular plate-shaped substrate 32 to form adjacent loops under tension between the slots 72 for the full length of the slots 72. Secured under tension, each loop of the continuous CNT fiber filament 51 preferably engages the upper surface 66 of the electrically-conductive substrate 32 and each loop of the continuous CNT fiber filament 51 preferably engages the adjacent loops of the continuous CNT fiber 34 to form a fully densified and circular-shaped emitting surface. In addition to or instead of securing the at least one continuous CNT fiber filament 51 to the electrically-conductive substrate 32 while the at least one continuous CNT fiber filament 51 is under tension, the at least one continuous CNT fiber filament 51 can be secured to the electrically-conductive substrate 32 while the at least one continuous CNT fiber filament 51 is under compression. For example, but not limited to, a clamping member can compress the at least one continuous CNT fiber filament 51 against the electrically-conductive substrate 32 while the at least one continuous CNT fiber filament 51 is bonded to the electrically-conductive substrate 32. It is noted that the arc shaped slots 72 enable the parallel and adjacent loops of the continuous CNT fiber filament 51 to form the circular-shaped emitting surface without overlapping any loops of the continuous CNT fiber filament. It is also noted that the FE cathode 14D according to the fifth embodiment of the present invention can alternatively have any other suitable configuration.

Figure 14A:
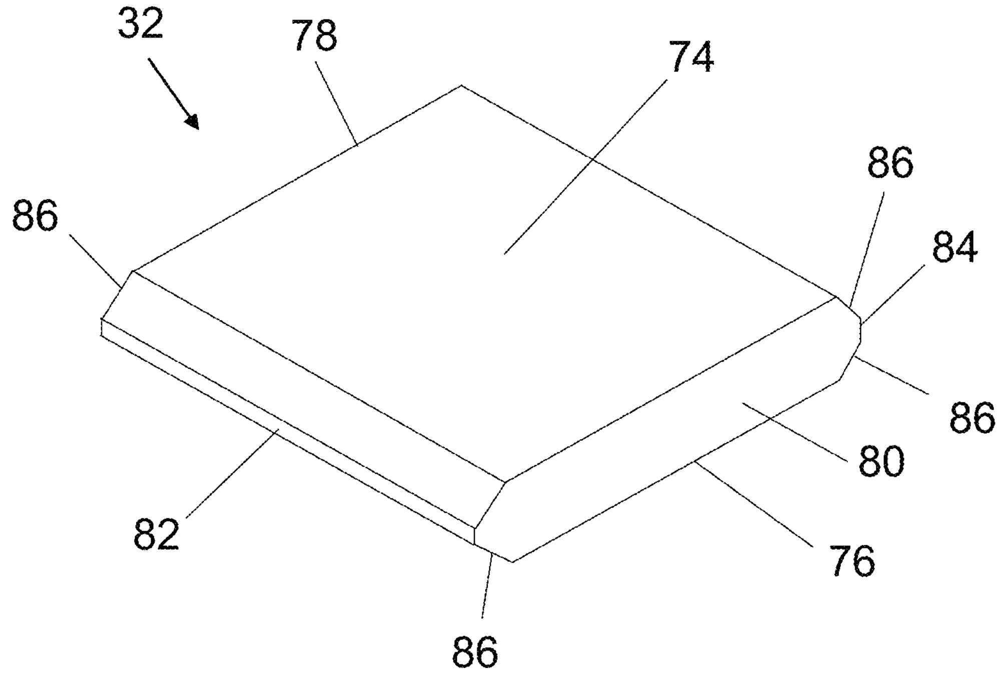
FIG. 14A is a perspective view of a rectangular plate-shaped electrically-conductive substrate according to a sixth embodiment of the present invention.
Figure 14C:
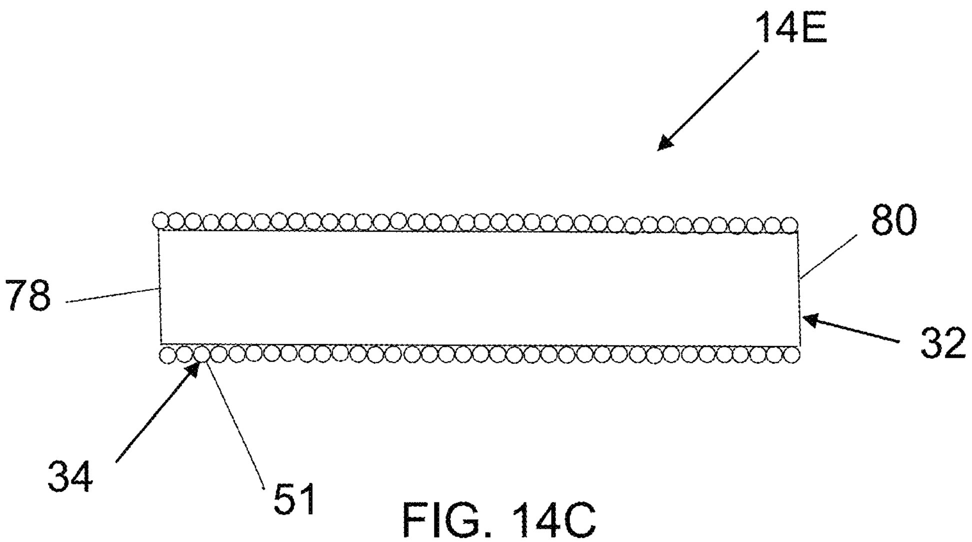
FIG. 14C is a cross sectional view taken along line 14C-14C of FIG. 14B.
Figure 14B:
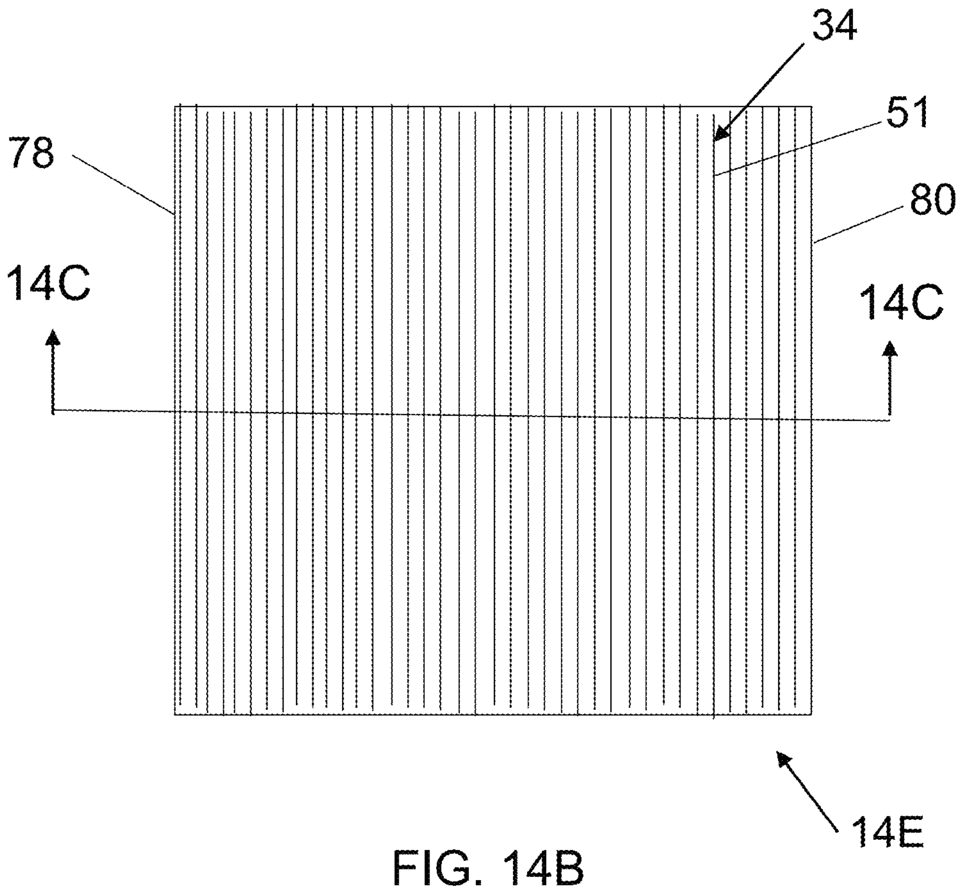
FIG. 14B is a top view an electrode according to the sixth embodiment of the invention with a continuous CNT fiber wound around the length the rectangular plate-shaped electrically-conductive substrate of FIG. 14A.

FIGS. 14A to 14C illustrate a FE cathode 14E according to a sixth embodiment of the present invention that is substantially the same as the FE cathode 14 of the first embodiment of the present invention except that the electrically-conductive substrate 32 is rectangular-plate shaped rather than cylinder-shaped, there is a rectangular-shaped emitting surface rather than the cylinder-shaped emitting surface, and the at least one continuous CNT fiber 34C is a single continuous CNT fiber filament 51 rather than a single continuous CNT fiber braided yarn 40. It is noted that the at least one continuous CNT fiber 34 can alternatively be of any other suitable type. The illustrated rectangular-plate shaped substrate 32 includes planar and opposed upper and lower surfaces 74, 76, planar and opposed first and second side surfaces 78, 80, and planar and opposed end surfaces 82, 84. It is noted that the illustrated rectangular-shaped plate is a square-shaped plate, but any other suitable rectangular shape can alternatively be utilized. The continuous CNT fiber filament 51 is wrapped around the rectangular plate-shaped electrically-conductive substrate 32 between the first and second end surfaces 82, 84 to form adjacent loops under tension for the full width of the electrically-conductive substrate 32C. The illustrated edges between the upper and lowers surfaces 74, 76 and the first and second end surfaces 82, 84 are each provided with chamfers 86. The chamfers 86 enable the continuous CNT filament 51 to maintain greater contact with rectangular-plate shaped substrate 32 at the ends rectangular-plate shaped substrate 32. It is noted that the chamfers 86 can be eliminated if desired. Secured under tension, each loop of the continuous CNT fiber filament 51 preferably engages the upper surface 74 of the electrically-conductive substrate 32 and each loop of the continuous CNT fiber filament 51 preferably engages the adjacent loops of the continuous CNT fiber 34 to form a fully densified and rectangular-shaped emitting surface. In addition to or instead of securing the at least one continuous CNT fiber filament 51 to the electrically-conductive substrate 32 while the at least one continuous CNT fiber filament 51 is under tension, the at least one continuous CNT fiber filament 51 can be secured to the electrically-conductive substrate 32 while the at least one continuous CNT fiber filament 51 is under compression. For example, but not limited to, a clamping member can compress the at least one continuous CNT fiber filament 51 against the electrically-conductive substrate 32 while the at least one continuous CNT fiber filament 51 is bonded to the electrically-conductive substrate 32. It is noted that the EF cathode 14E according to the sixth embodiment can alternatively have any other suitable configuration.

Figure 15A:
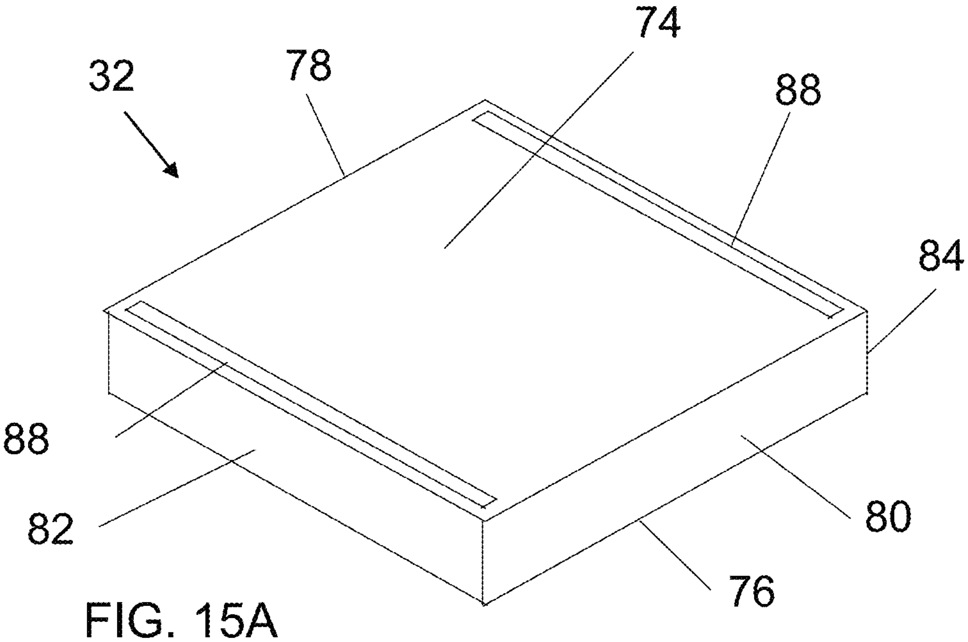
FIG. 15A is a perspective view of a rectangular plate-shaped electrically-conductive substrate according to a seventh embodiment of the present invention.
Figure 15B:
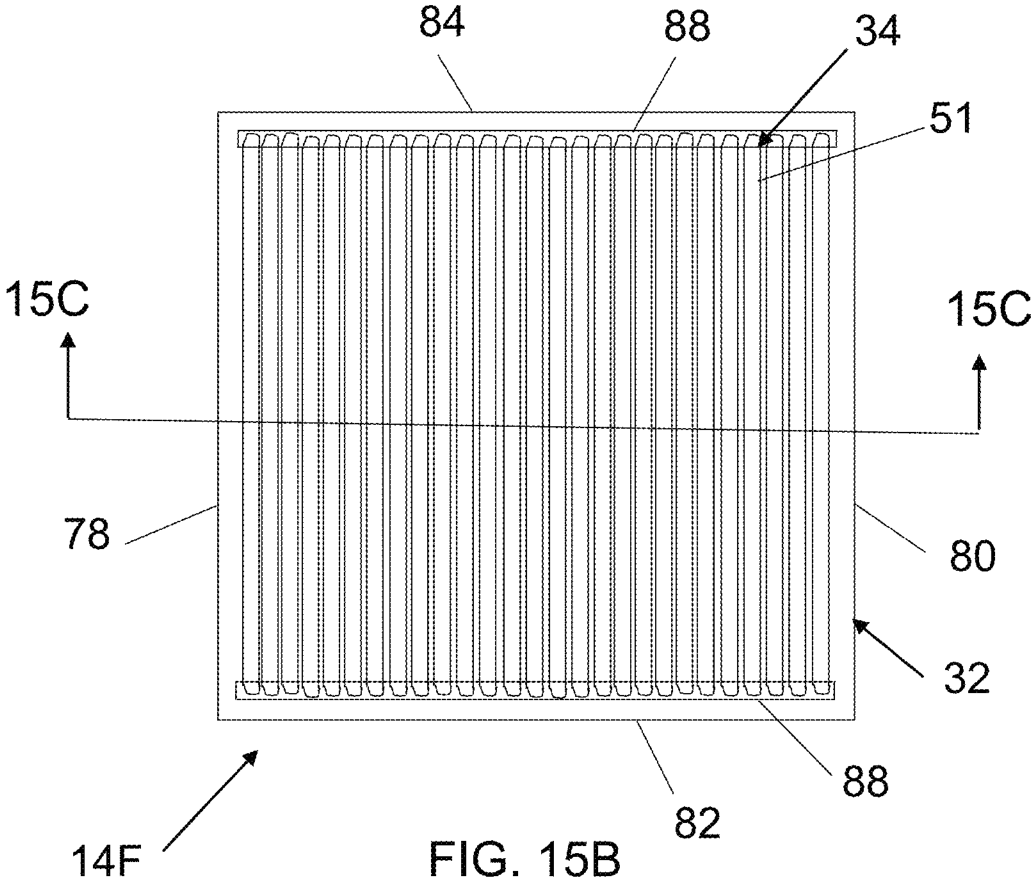
FIG. 15B is a top view an electrode according to the seventh embodiment of the invention with a continuous CNT fiber wound around the length the rectangular plate-shaped electrically-conductive substrate of FIG. 15A.
Figure 15C:
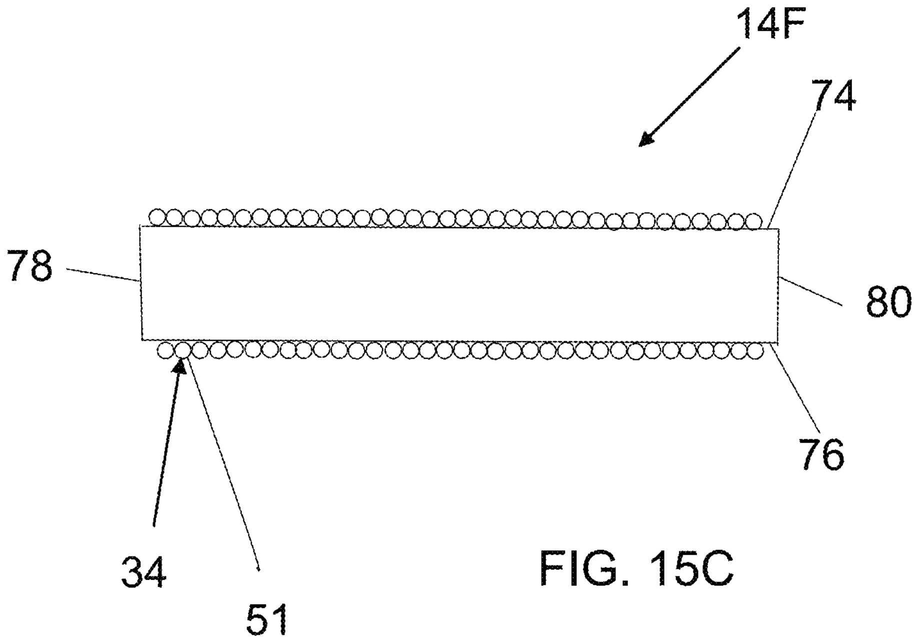
FIG. 15C is a cross sectional view taken along line 15C-15C of FIG. 15B.

FIGS. 15A to 15C illustrate a FE cathode 14F according to a seventh embodiment of the present invention that is substantially the same as the FED cathode 14E according to the sixth embodiment of the present invention except that the chamfers 86 have been replaced by a pair of parallel and opposed slots 88. The slots 88 each extend entirely through the substrate 32 between the upper and lower surfaces 74, 76. The illustrated slots 88 are substantially straight and are located near the edges with the first and second end surfaces 82, 84. The continuous CNT fiber filament 51 is wrapped through the slots 88 and around the rectangular-shaped plate substrate 32 to form adjacent loops under tension between the slots 88 for the full length of the slots 88. Secured under tension, each loop of the continuous CNT fiber filament 51 preferably engages the upper surface 74 of the electrically-conductive substrate 32 and each loop of the continuous CNT fiber filament 51 preferably engages the adjacent loops of the continuous CNT fiber 34 to form a fully densified and rectangular-shaped emitting surface. In addition to or instead of securing the at least one continuous CNT fiber filament 51 to the electrically-conductive substrate 32 while the at least one continuous CNT fiber filament 51 is under tension, the at least one continuous CNT fiber filament 51 can be secured to the electrically-conductive substrate 32 while the at least one continuous CNT fiber filament 51 is under compression. For example, but not limited to, a clamping member can compress the at least one continuous CNT fiber filament 51 against the electrically-conductive substrate 32 while the at least one continuous CNT fiber filament 51 is bonded to the electrically-conductive substrate 32. It is noted that the slots 88 enable the parallel and adjacent loops of the continuous CNT fiber filament 51 to form the rectangular-shaped emitting surface without any loops of the continuous CNT fiber filament covering the first and second end surfaces 82, 84. It is also noted that the FE cathode 14F according to the seventh embodiment of the present invention can alternatively have any other suitable configuration.

Figure 16A:
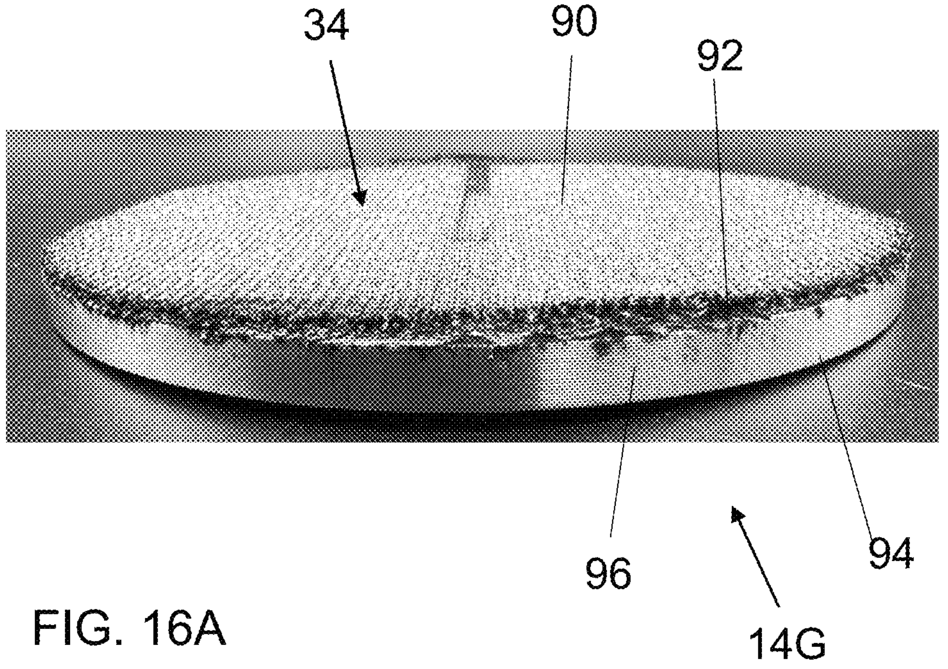
FIG. 16A is a perspective view of an electrode according to an eighth embodiment of the present invention with a continuous CNT fabric wound over upper surface of a circular plate-shaped electrically-conductive substrate.
Figure 16B:
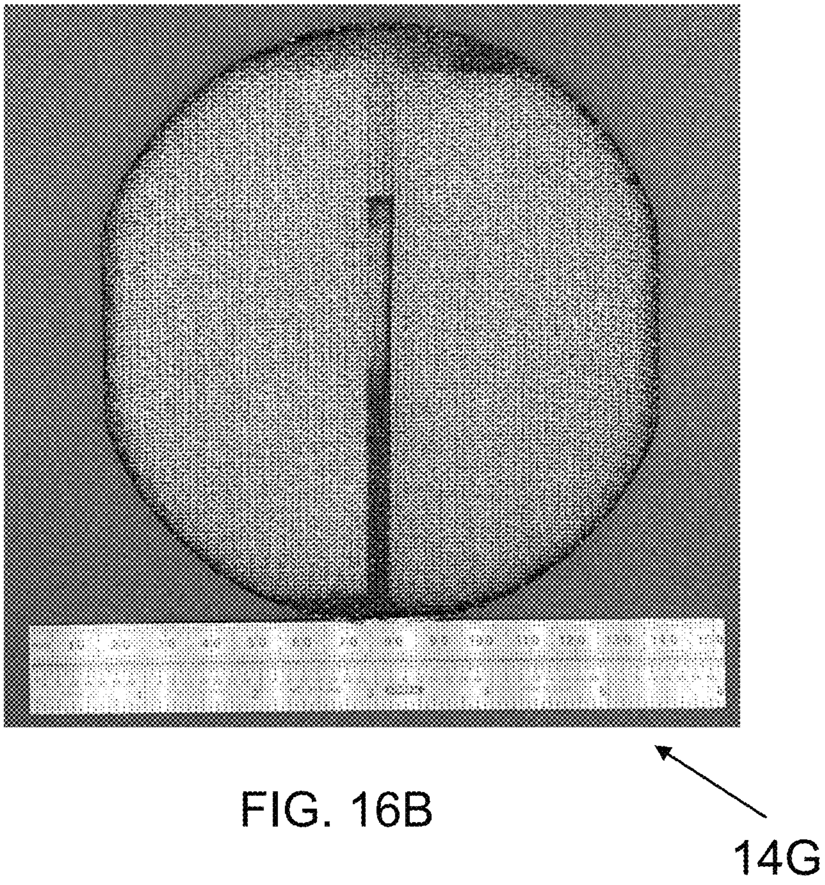
FIG. 16B is a top view of the electrode of FIG. 16A.
Figure 16C:
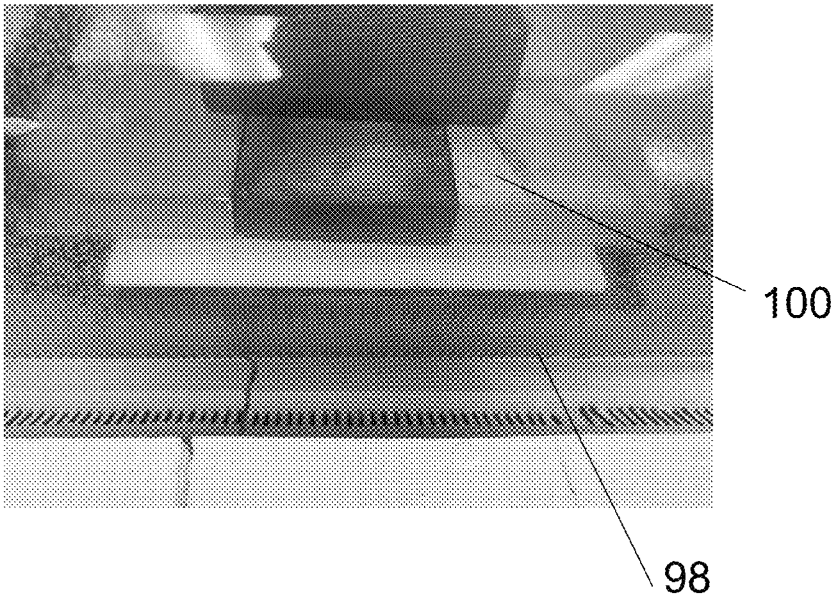
FIG. 16C is a perspective view of a compressing fixture within a vacuum oven for securing the continuous CNT fabric to the circular plate-shaped electrode under compression.

FIGS. 16A to 16C illustrate a FE cathode 14G according to an eighth embodiment of the present invention that is substantially the same as the FE cathode 14D according to the fifth embodiment of the present invention except that the continuous CNT fiber 34 is a continuous CNT fiber fabric 90 instead of the continuous CNT fiber filament 51, the slots 72 in the substrate 32 are eliminated, continuous CNT fiber 34 is only over an upper surface 92 of the substrate 32, and the continuous CNT fiber 34 is secured under compression rather than tension. The circular-shaped plate substrate 32 has opposed and planar upper and lower surfaces 92, 94 with an outer circumferential surface 96 therebetween. The continuous CNT fiber fabric 90 is wrapped over and cut to the size of the upper surface 92. The continuous CNT fiber fabric 90 is bonded to the circular plate-shaped substrate 32 under compression. When the continuous CNT fiber fabric 90 is bonded to the circular plate-shaped substrate 32 by vacuum brazing, weights 100 can compress the continuous CNT fiber fabric 90 against the circular plate-shaped substrate 32 that are brazed within a vacuum oven 98. Secured under compression, the continuous CNT fiber fabric 90 forms a circular-shaped emitting surface with a uniform height above the substrate 32. In addition to or instead of securing the at least one continuous CNT fiber fabric 90 to the electrically-conductive substrate 32 while the at least one continuous CNT fiber fabric 90 is under compression, the at least one continuous CNT fiber fabric 90 can be secured to the electrically-conductive substrate 32 while the at least one continuous CNT fiber fabric 90 is under tension. It is also noted that the FE cathode 14G according to the eighth embodiment of the present invention can alternatively have any other suitable configuration.

Figure 17A:
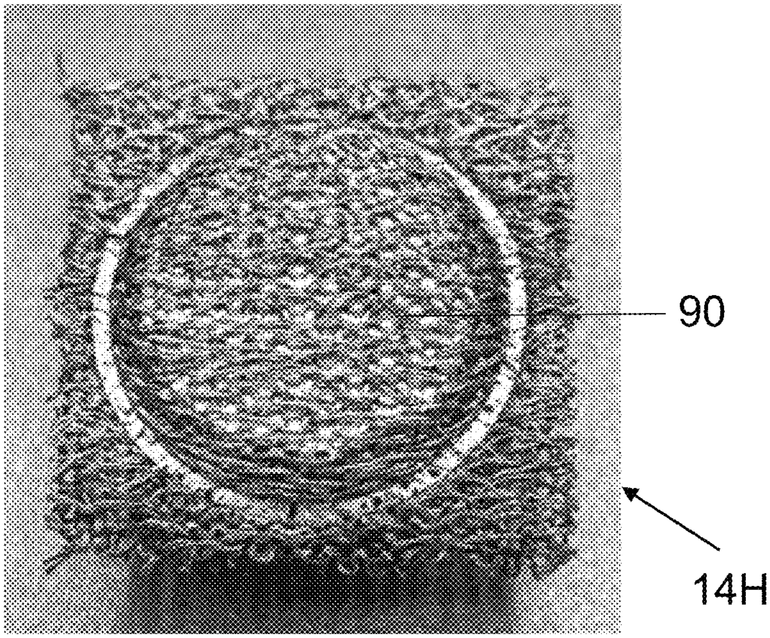
FIG. 17A is a perspective view of an electrode according to a ninth embodiment of the present invention with a continuous CNT fabric wound over an upper surface of a circular plate-shaped electrically-conductive substrate.
Figure 17B:
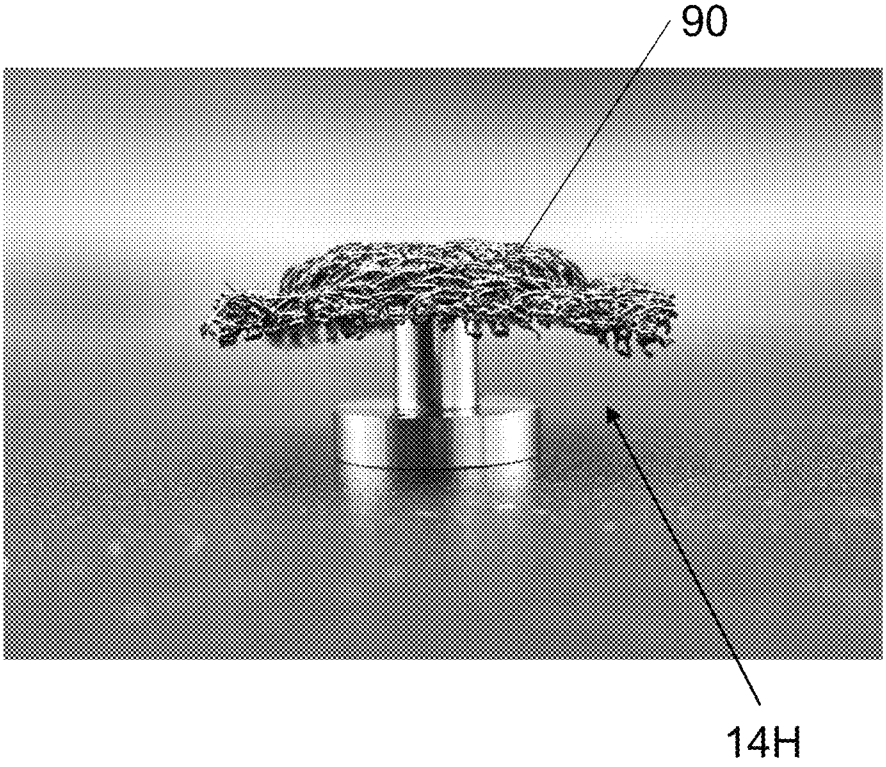
FIG. 17B is a side view of the electrode of FIG. 17A.
Figure 17C:
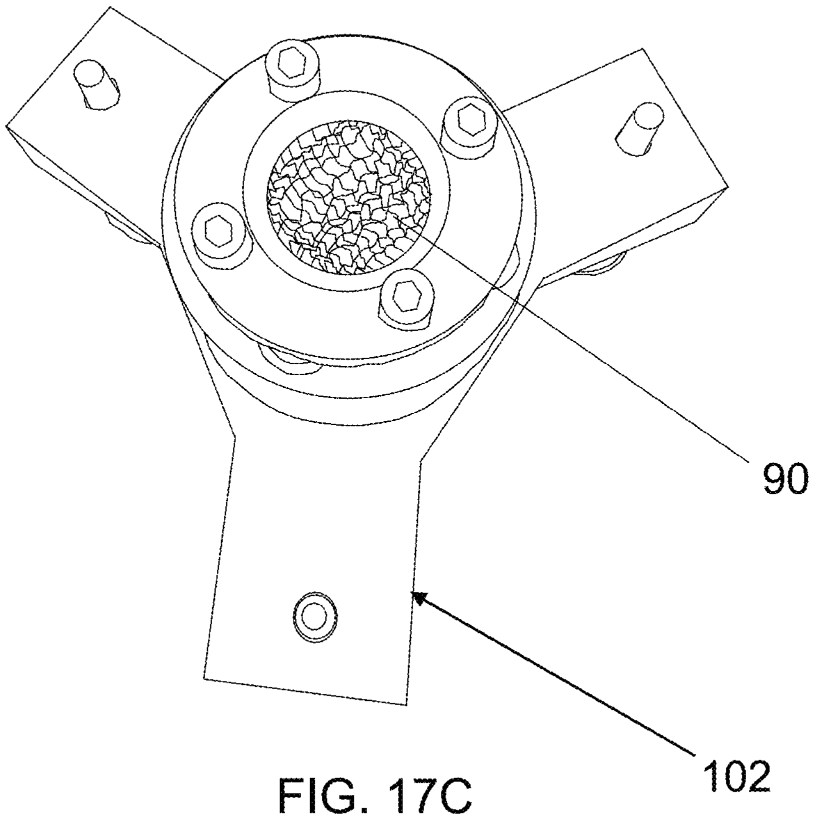
FIG. 17C is a perspective view of a tensioning fixture for attachment of the continuous CNT fabric to the circular plate-shaped electrode under tension.

FIGS. 17A to 17C illustrate a FE cathode 14H according to a ninth embodiment of the present invention that is substantially the same as the FE cathode 14G according to the eighth embodiment of the present invention except that the continuous CNT fiber fabric 90 is under tension rather than compression. FIGS. 17A and 17B show the continuous CNT fiber fabric 90 after bonding to the substrate 32 but before being cut or trimmed to match the upper surface 92 of the substrate 32. FIG. 17C shows a tensioning fixture 102 for pulling the continuous CNT fabric in tension during attachment of the continuous CNT fabric 90 to the circular plate-shaped electrode 32 under tension. Secured under tension, the continuous CNT fiber fabric 90 forms a circular-shaped emitting surface with a uniform height above the substrate 32. In addition to or instead of securing the at least one continuous CNT fiber fabric 90 to the electrically-conductive substrate 32 while the at least one continuous CNT fiber fabric 90 is under tension, the at least one continuous CNT fiber fabric 90 can be secured to the electrically-conductive substrate 32 while the at least one continuous CNT fiber fabric 90 is additionally or additionally under compression. It is also noted that the FE cathode 14H according to the ninth embodiment of the present invention can alternatively have any other suitable configuration.

It should be understood that each of the above-described embodiments of the present invention can alternatively have any suitable materials, features, components, and/or configurations of any of the other described embodiments.

From the above, it should be realized that more efficient, compact, and reliable VEDs such as, for example but not limited to, magnetrons that can operate at higher frequencies and power levels can be obtained utilizing electrodes according to the inventions disclosed above. This could open up new opportunities in areas such as wireless power transmission, advanced radar systems, high-resolution imaging, advanced weaponry, spacecraft propulsion systems, among other inventions, technologies, and devices.

The terms "comprises," "comprising," "includes," "including," "has," "having," or any other variations thereof used herein, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference to "one embodiment," "certain embodiments," "an embodiment," "implementation(s)," "aspect(s)," or similar terms used herein means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps, or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All patents, patent applications (and any patents which issue thereon, as well as any corresponding published foreign patent applications), publications, and other documents mentioned throughout this description are hereby incorporated by reference herein. It is expressly not admitted, however, that any of the documents incorporated by reference herein teach or disclose the present invention.

The words "about," "approximately," or the like, when accompanying a numerical value, are to be construed as indicating a deviation as would be appreciated by one of ordinary skill in the art to operate satisfactorily for an intended purpose.

For each numerical range throughout this specification and the claims, it should be understood that every maximum numerical limitation given includes every lower numerical limitation, as if such lower numerical limitations were expressly written herein. Also, for each numerical range throughout this specification and the claims, it should be understood that every minimum numerical limitation given includes every higher numerical limitation, as if such higher numerical limitations were expressly written herein. Furthermore, every numerical range given throughout this specification and the claims includes every narrower numerical range that falls within such broader numerical range.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

References herein to items in the singular should be understood to include items in the plural, and vice versa, unless explicitly stated otherwise or clear from the text.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An electrode for a vacuum electronic device, the cathode comprising:

an electrically-conductive substrate; and at least one continuous carbon nanotube (CNT) fiber in tension and/or compression around at least a portion of the electrically-conductive substrate and secured to the electrically-conductive substrate by a conductive bond.

2. The electrode of claim 1, wherein the electrode is a cathode.

3. The electrode of claim 2, wherein the cathode is a field emission cathode.

4. The electrode of claim 1, wherein the electrically-conductive substrate is a metallic substrate.

5. The electrode of claim 1, wherein the electrically-conductive substrate is one of a cylinder, a hoop, a circular plate, and a rectangular plate.

6. The electrode of claim 5, wherein the continuous CNT fiber is one of a continuous CNT fiber filament, a CNT fiber yarn, a continuous CNT fiber braided yarn, a continuous CNT film, and a continuous CNT fabric.

7. The electrode of claim 1, wherein the continuous CNT fiber is one of a continuous CNT fiber filament, a CNT fiber yarn, a continuous CNT fiber braided yarn, a continuous CNT film, and a continuous CNT fabric.

8. The electrode of claim 1, wherein the conductive bond between the continuous CNT fiber and the electrically-conductive substrate comprises one or more of a carbon-based epoxy, a silver epoxy, a CNT-containing adhesive, a nanocarbon-containing adhesive, electroplating bond, or vacuum brazing material.

9. The electrode of claim 1, wherein the at least one continuous CNT fiber is secured to the electrically-conductive substrate by vacuum brazing material.

10. The electrode of claim 1, wherein the electrically-conductive substrate is configured to be connected to one of an electrical power supply and an electrical ground.

11. The electrode of claim 1, wherein the electrode is configured to withstand up to at least 500 kV.

12. The electrode of claim 1, wherein the at least one continuous CNT fiber forms one of a cylindrical-shaped emitting surface, a ring-shaped emitting surface, a toroidal shaped emitting surface, a circular-shaped emitting surface, and a rectangular-shaped emitting surface.

13. The electrode of claim 1, wherein the electrode is a cathode, the electrically-conductive substrate is a cylindric-shaped metallic substrate, the at least one continuous carbon nanotube (CNT) fiber comprises at least one continuous carbon nanotube (CNT) fiber woven yarn, and the at least one continuous carbon nanotube (CNT) fiber woven yarn is wrapped around a circumference of the cylinder-shaped metallic substrate to form adjacent loops.

14. The electrode of claim 1, wherein the electrode is a cathode, the electrically-conductive substrate is a cylindric-shaped metallic substrate, the at least one continuous carbon nanotube (CNT) fiber comprises at least one continuous carbon nanotube (CNT) fiber woven yarn, and wherein the at least one continuous carbon nanotube (CNT) fiber woven yarn is wrapped around a circular groove in an end face of the cylinder-shaped metallic substrate.

15. The electrode of claim 1, wherein the electrode is a cathode, the electrically-conductive substrate is a hoop-shaped metallic substrate, the at least one continuous carbon nanotube (CNT) fiber comprises at least one continuous carbon nanotube (CNT) fiber filament, and the at least one continuous carbon nanotube (CNT) fiber filament is wrapped around the hoop-shaped metallic substrate to form adjacent loops.

16. The electrode of claim 1, wherein the electrode is a cathode, the electrically-conductive substrate is a circular plate-shaped metallic substrate having a pair of spaced apart arc-shaped slots therethrough, the at least one continuous carbon nanotube (CNT) fiber comprises at least one continuous carbon nanotube (CNT) fiber filament, the at least one continuous carbon nanotube (CNT) fiber filament is wrapped through the slots and around the circular plate-shaped metallic substrate to form adjacent loops.

17. The electrode of claim 1, wherein the electrode is a cathode, the electrically-conductive substrate is a rectangular plate-shaped metallic substrate having a pair of spaced apart slots therethrough, the at least one continuous carbon nanotube (CNT) fiber comprises at least one continuous carbon nanotube (CNT) fiber filament, the at least one continuous carbon nanotube (CNT) fiber filament is wrapped through the slots and around the rectangular plate-shaped metallic substrate to form adjacent loops.

18. An electrode for a vacuum electronic device, the electrode comprising:

an electrically-conductive metallic substrate; and a carbon nanotube (CNT) fabric comprising at least one continuous CNT fiber over at least a portion of the electrically-conductive substrate and secured by a conductive bond to the electrically-conductive metallic substrate;

wherein the CNT fabric is secured in tension and/or compression.

19. A field emissive cathode for a vacuum electronic device, the field emission cathode comprising:

an electrically-conductive metallic substrate;

at least one continuous carbon nanotube (CNT) fiber in tension and/or compression around at least a portion of the electrically-conductive substrate;

wherein the at least one continuous CNT fiber is secured to the electrically-conductive metallic substrate by a conductive bond;

wherein the electrically-conductive substrate is one of a cylinder, a hoop, a circular plate, and a rectangular plate;

wherein the continuous CNT fiber is one of a continuous CNT fiber filament, a CNT fiber yarn, a continuous CNT fiber braided yarn, a continuous CNT film, and a continuous CNT fabric; and wherein the conductive bond between the continuous CNT fiber and the electrically-conductive substrate comprises one or more of a carbon-based epoxy, a silver epoxy, a CNT-containing adhesive, a nanocarbon-containing adhesive, electroplating bond, or vacuum brazing material.

* * * * *